(12) United States Patent
Tsai

(10) Patent No.: US 10,793,252 B2
(45) Date of Patent: Oct. 6, 2020

(54) APPARATUS AND METHOD FOR COVERING AN OPENING IN AN AIRCRAFT

(71) Applicant: The Boeing Company, Chicago, IL (US)

(72) Inventor: Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 15/941,231

(22) Filed: Mar. 30, 2018

(65) Prior Publication Data

US 2019/0300146 A1    Oct. 3, 2019

(51) Int. Cl.
*B64C 9/02*     (2006.01)
*B64C 7/00*     (2006.01)
*B64C 9/16*     (2006.01)

(52) U.S. Cl.
CPC .................. *B64C 9/02* (2013.01); *B64C 7/00* (2013.01); *B64C 9/16* (2013.01)

(58) Field of Classification Search
CPC .... B64C 7/00; B64C 9/02; B64C 9/16; B64C 9/18

See application file for complete search history.

(56) References Cited

U.S. PATENT DOCUMENTS

| | | | |
|---|---|---|---|
| 3,802,480 A | 4/1974 | Daggy | |
| 4,576,347 A * | 3/1986 | Opsahl | B64C 9/16 244/129.1 |
| 4,854,528 A | 8/1989 | Hofrichter | |
| 5,183,092 A | 2/1993 | Jelic | |
| 5,520,358 A * | 5/1996 | Kahn | B64C 1/14 244/1 R |
| 6,892,783 B1 | 5/2005 | Comeau et al. | |
| 7,744,034 B2 | 6/2010 | Coughlin | |
| 7,958,926 B2 | 6/2011 | Colson et al. | |
| 9,296,464 B1 | 3/2016 | Tuohimaa et al. | |
| 9,623,957 B2 | 4/2017 | Bleazard | |
| 2003/0145882 A1 | 8/2003 | Sanna | |
| 2006/0145013 A1* | 7/2006 | Gomez | B64C 9/02 244/130 |
| 2014/0203144 A1* | 7/2014 | Boyer, Jr. | B64C 1/1415 244/129.5 |
| 2016/0059952 A1* | 3/2016 | Bleazard | B64C 9/18 244/215 |
| 2017/0001711 A1* | 1/2017 | Salmon | B64C 3/48 |
| 2017/0327204 A1* | 11/2017 | de Sousa | F16J 15/104 |
| 2019/0092451 A1* | 3/2019 | Bond | B64C 7/00 |
| 2019/0248470 A1* | 8/2019 | Gonze | B64C 7/00 |

FOREIGN PATENT DOCUMENTS

EP          0280339         8/1988

* cited by examiner

*Primary Examiner* — Philip J Bonzell
*Assistant Examiner* — Tye William Abell
(74) *Attorney, Agent, or Firm* — Walters & Wasylyna LLC

(57) ABSTRACT

An apparatus for covering an opening in a fuselage of an aircraft includes a track and a plurality of panels, coupled to the track. At least one of the panels is movable along the track relative to an adjacent one of the panels between a first position and a second position.

20 Claims, 17 Drawing Sheets

APPARATUS AND METHOD FOR COVERING AN OPENING IN AN AIRCRAFT

FIELD

The present disclosure is generally related to aircraft and, more particularly, to apparatuses and methods for covering an opening in an aircraft.

BACKGROUND

Fixed-wing aircraft typically include flaps mounted on the trailing edges of the wings. Controlled movement of the flaps modifies the effective contour of the wings and, thus, modifies the lift characteristics of the wings. In certain types of flap systems, the inboard wing flap has a torque member that extends into the side of the fuselage or into the side of a fuselage/wing fairing structure. The inboard end of the torque member is coupled to a flap support mechanism that controls movement of the flap between stowed and deployed positions. The flap support mechanism is housed within the fuselage or the fuselage/wing fairing structure.

To accommodate motion of the torque member during actuation of the flap, an opening may be formed in the fuselage or in the fuselage/wing fairing structure. When left uncovered, this opening may affect aircraft aerodynamics. For example, when left uncovered, the aircraft may experience vibrations and/or noise during cruise and/or landing. Various solutions have been attempted to cover this opening. However, these solutions typically only cover a portion of the opening or only cover the opening during one stage of the motion of the flap. Further, some of these solutions position the cover in the airstream during one or more stages of the motion of the flap, which may also affect aircraft aerodynamics.

Accordingly, those skilled in the art continue with research and development efforts in the field of aircraft wing flap actuation.

SUMMARY

In an example, the disclosed apparatus for covering an opening in a fuselage of an aircraft includes a track and a plurality of panels, coupled to the track. At least one of the panels is movable along the track relative to an adjacent one of the panels between a first position and a second position.

In an example, the disclosed aircraft includes a fuselage having an opening, a wing coupled to the fuselage, a flap coupled to the wing adjacent to the fuselage, and a torque member coupled to the flap. The aircraft also includes a track, coupled to the fuselage adjacent to the opening, and a plurality of panels, coupled to the track such that the plurality of panels covers the opening. The torque member extends into the opening through one of the panels. At least one of the panels is movable along the track relative to an adjacent one of the panels as the flap moves between a first position and a second position.

In an example, the disclosed method for covering an opening in a fuselage of an aircraft includes steps of: (1) covering the opening with a plurality of panels located adjacent to the opening; and (2) moving at least one of the panels relative to an adjacent one of the panels as a flap moves between a first position and a second position.

Other examples of the disclosed apparatus and method will become apparent from the following detailed description, the accompanying drawings and the appended claims.

DETAILED DESCRIPTION

Figure 1:
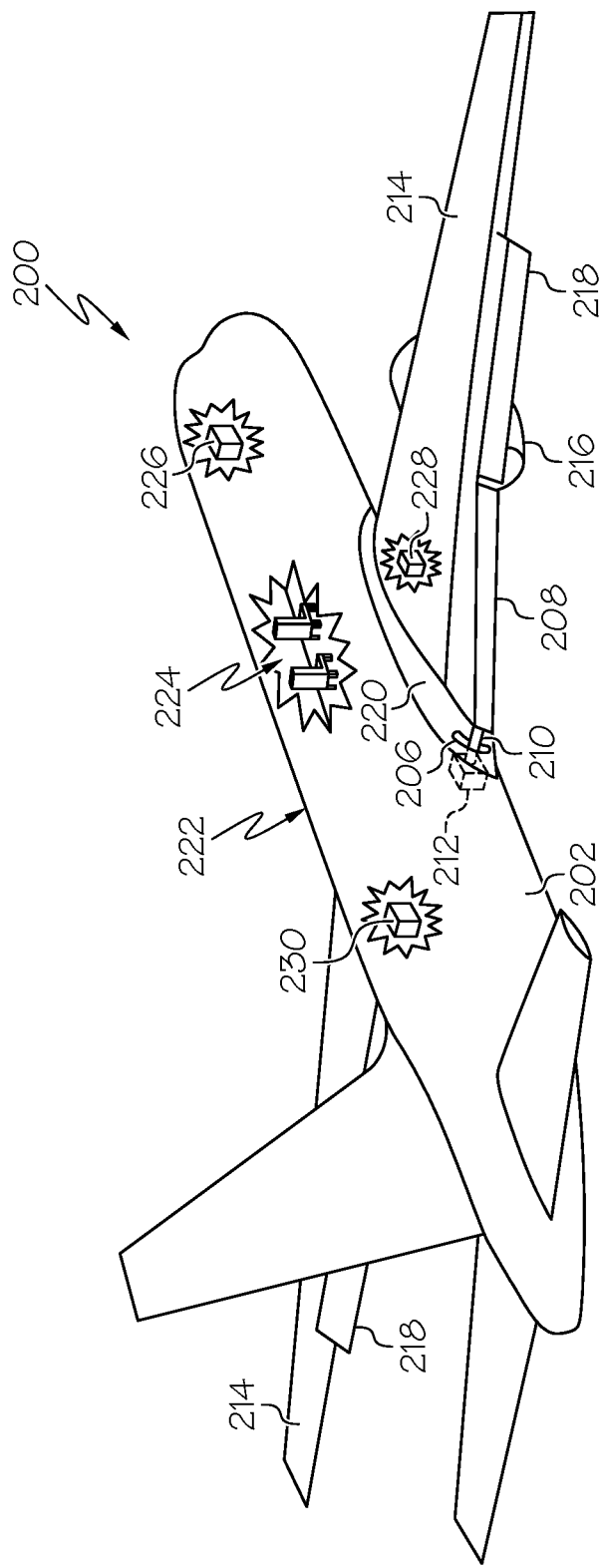
FIG. 1 is a schematic, perspective view of an example of an aircraft.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

FIG. 1 is an illustrative example of an aircraft 200. In the illustrative example, the aircraft 200 is a fixed-wing aircraft. The aircraft 200 includes a fuselage 202, a pair of wings 214 (referred to individually as wing 214 and collectively as wings 214), and a propulsion system 216. The aircraft 200 also includes a plurality of high-level systems, such as, but not limited to, an electrical system 226, a hydraulic system 228, and/or an environmental system 230. Any number of other systems may also be included.

The fuselage 202 is the main body of the aircraft 200 and includes any suitable central structure configured to hold a crew, one or more passengers, and/or cargo. In the illustrative example, the fuselage 202 is an elongate, generally cylindrical fuselage. The fuselage 202 includes a nose portion at a forward end of the fuselage 202 and a tail portion at an aft end of the fuselage 202. As used herein, the terms "forward" and "aft" have their ordinary meaning as known to those skilled in the art and refer to positions relative to a direction of movement of the aircraft 200. The tail portion may include a vertical stabilizer and horizontal stabilizers, which may also include various control surfaces.

The fuselage includes an airframe 222 that defines an interior 224, which may include a passenger compartment and/or a cargo compartment. A fuselage/wing fairing 220 may be provided at each interface between the fuselage 202 and the wing 214 and may extend from proximate (at or near) the fuselage 202 to proximate the associated wing 214.

The wings 214 include any suitable airfoil structures that are configured to provide lift to the aircraft 200. In the illustrative example, the wings 214 are elongate structures extending from a lower portion of the fuselage 202 in a swept wing, tapered planform. In other examples, the wings 214 are straight or delta-shaped. In still other examples, the wings 214 are trapezoidal, constant, elliptical, semi-elliptical, or other configurations known in the art.

In the illustrative example, the propulsion system 216 includes two turbofan engines mounted to the wings 214, for example, by pylons. In an example, each engine is housed in a nacelle, which includes an inlet and a nozzle. In other examples, the engines may be mounted to the fuselage 202 or other aircraft structures, such as the tail portion. In various other examples, the propulsion system 216 may include more or fewer engines and other types of engines (e.g., turboprop engines) may be used.

In various examples, the wings 214 include control surfaces, such as ailerons and flaps. In an example, each one of the wings 214 includes an inboard flap 208 (referred to individually as inboard flap 208 and collectively as inboard flaps 208) and an outboard flap 218 (referred to individually as outboard flap 218 and collectively as outboard flaps 218). As used herein, the terms "inboard" and "outboard" have their ordinary meaning as known to those skilled in the art and refer to positions relative to a center line of the aircraft 200.

The inboard flaps 208 and/or the outboard flaps 218 include any suitable pivoting structure mounted on the trailing edge of the wing 214. The inboard flaps 208 and/or the outboard flaps 218 are configured to alter the lift characteristics of the wing 214. The inboard flaps 208 and/or the outboard flaps 218 are movable between at least a raised (stowed, retracted, or "flaps up") position and a lowered (deployed, extended, or "flaps down") position. In some examples, the inboard flaps 208 and/or the outboard flaps 218 are pivotable about a fixed axis. In some examples, the inboard flaps 208 and/or the outboard flaps 218 pivot through a predetermined path, which is, in some cases, generally arcuate or curved. In other words, in some examples, a pivot axis of the inboard flap 208 and/or the outboard flap 218 translates along a predetermined travel path, which is, in some cases, arcuate or curved.

In an example, the aircraft 200 also includes a flap support mechanism 212, also commonly referred to as a flap carriage mechanism. The flap support mechanism 212 is associated with each wing 214 for actuating the inboard flaps 208. In an example, the flap support mechanism 212 includes a motorized arm that is located, or housed, within the fuselage 202 or the fuselage/wing fairing 220.

In an example, a torque member 210, also commonly referred to as a torque tube, couples the flap support mechanism 212 with the associated inboard flap 208 to transfer an actuating/de-actuating (e.g., lowering/raising) force from the flap support mechanism 212 to the associated inboard flap 208. The torque member 210 extends through an opening 206 in the aircraft 200 (e.g., an opening 206 in the fuselage 202 and/or the fuselage/wing fairing 220). The opening 206 in the aircraft 200 is sized and shaped to accommodate the travel path of the torque member 210 as the inboard flap 208 is lowered and raised.

Figure 2:
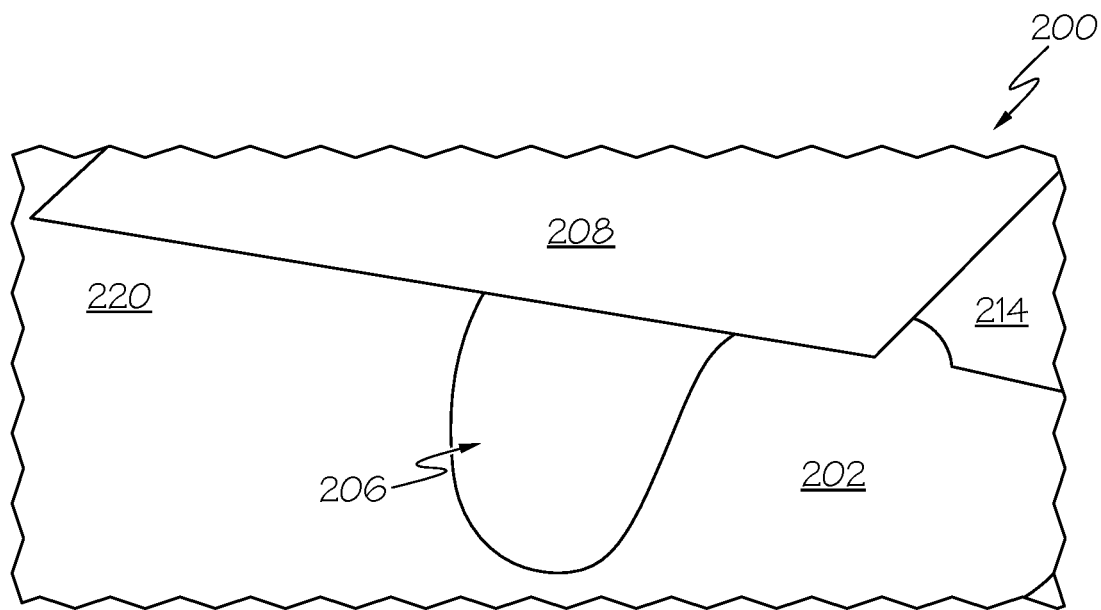
FIG. 2 is a schematic, exterior, perspective view of an example of a portion of the aircraft showing a wing and a fuselage of the aircraft.

FIG. 2 illustrates a partial, exterior view of an example aircraft 200 taken from under the wing 214 and showing the fuselage 202 of the aircraft 200. The wing 214 includes the inboard flap 208, which is adjacent to a wing-fairing portion (e.g., fuselage/wing fairing 220) of the fuselage 202. In the illustrative example, the inboard flap 208 is configured to pivot and translate though an arc as the inboard flap 208 moves between the raised and lowered positions. FIG. 2 shows the inboard flap 208 in a generally raised position.

Figure 3:
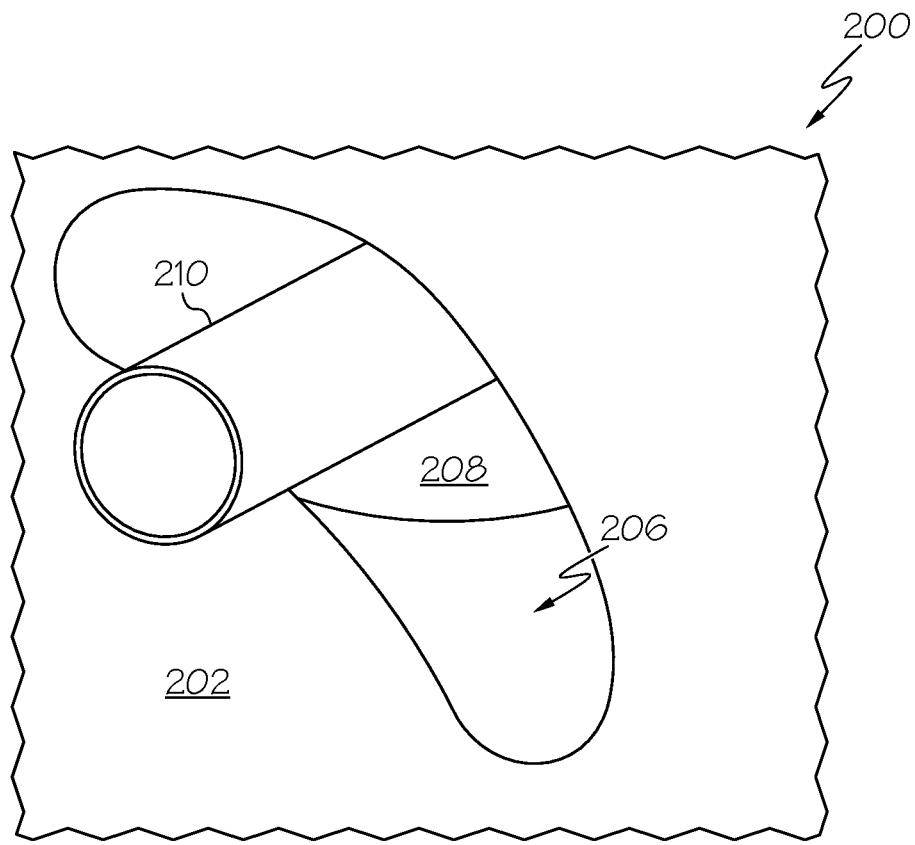
FIG. 3 is a schematic, interior, perspective view of an example of a portion of the aircraft showing an opening in the aircraft and a torque member extending through the opening.

FIG. 3 illustrates a partial, interior view of the aircraft 200 generally opposite the view shown in FIG. 2 and showing the torque member 210 extending from the inboard flap 208 and through the opening 206 in the fuselage 202. The inboard flap 208 is actuated or moved between the raised and lowered positions by way of the torque member 210, which extends through the opening 206 formed in the fuselage 202. The opening 206 is configured to enable a full range of motion for the torque member 210 and the associated inboard flap 208 during operation. In examples where the opening 206 in the aircraft 200 serves as an access opening for passage of the torque member 210, the opening 206 may also be commonly referred to as a torque tube slot.

Figure 4:
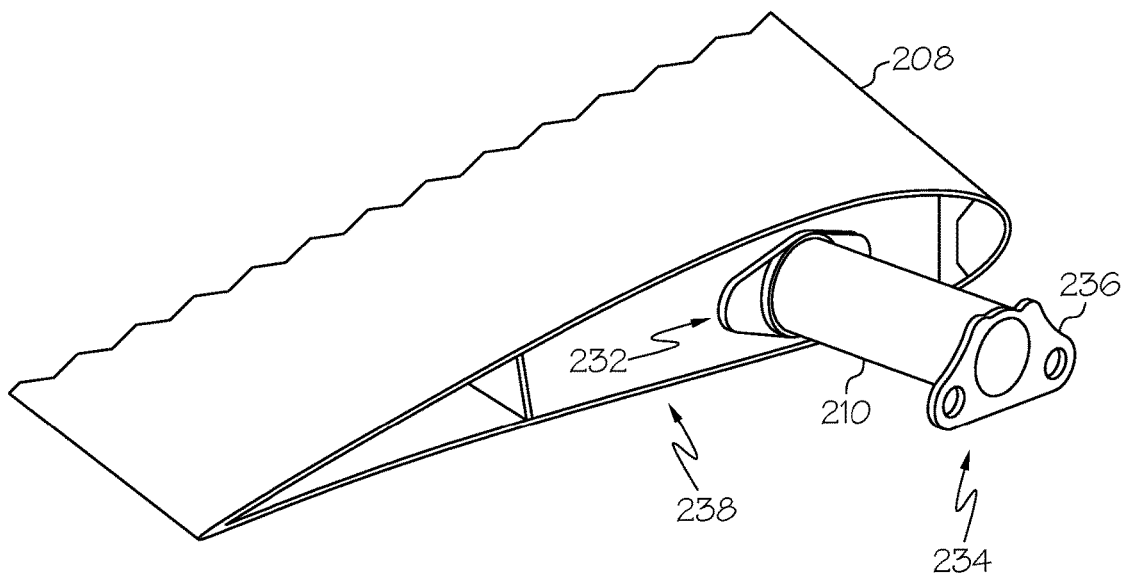
FIG. 4 is a schematic, perspective view of an example of a portion of a flap and the torque member of the aircraft.
Figure 5:
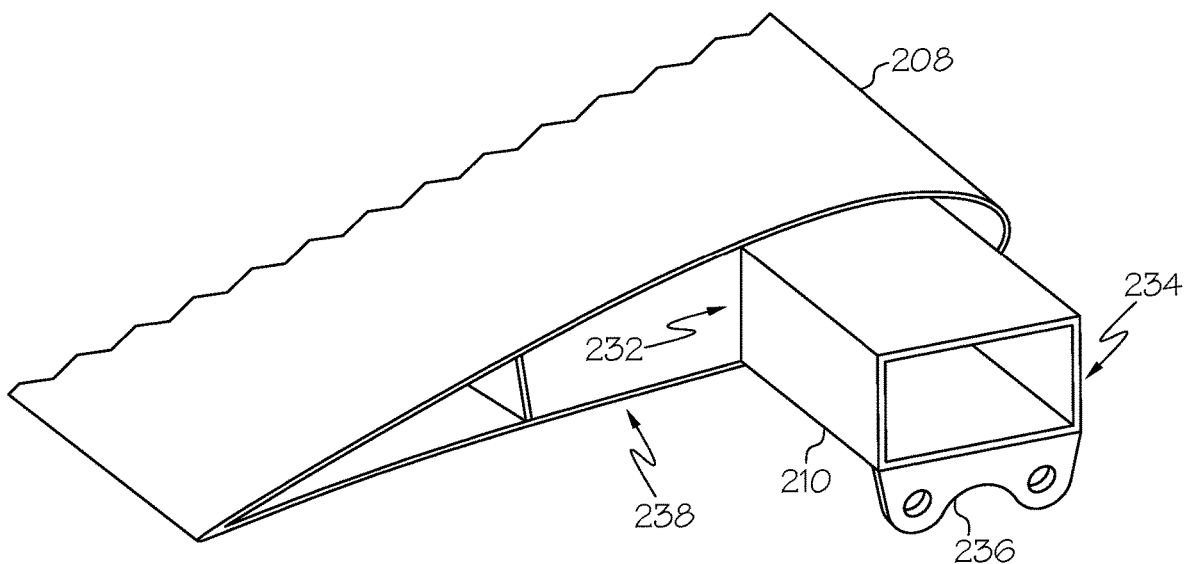
FIG. 5 is a schematic, perspective view of an example of the flap and the torque member of the aircraft.

FIGS. 4 and 5 illustrate partial, perspective views of examples of the inboard flap 208. The torque member 210 is coupled to the inboard flap 208 in any suitable manner sufficient to transfer actuation forces from the flap support mechanism 212 (FIG. 1) to the inboard flap 208. The torque member 210 extends outward from an inboard end 234 of the inboard flap 208. In an example, the torque member 210 is located proximate to the leading edge of the inboard flap 208. The torque member 210 may have any one of various cross-sectional shapes. In the illustrative example of FIG. 4, the torque member 210 has a generally circular cross-sectional shape. In the illustrative example of FIG. 5, the torque member 210 has a generally rectangular cross-sectional shape.

Figure 6:
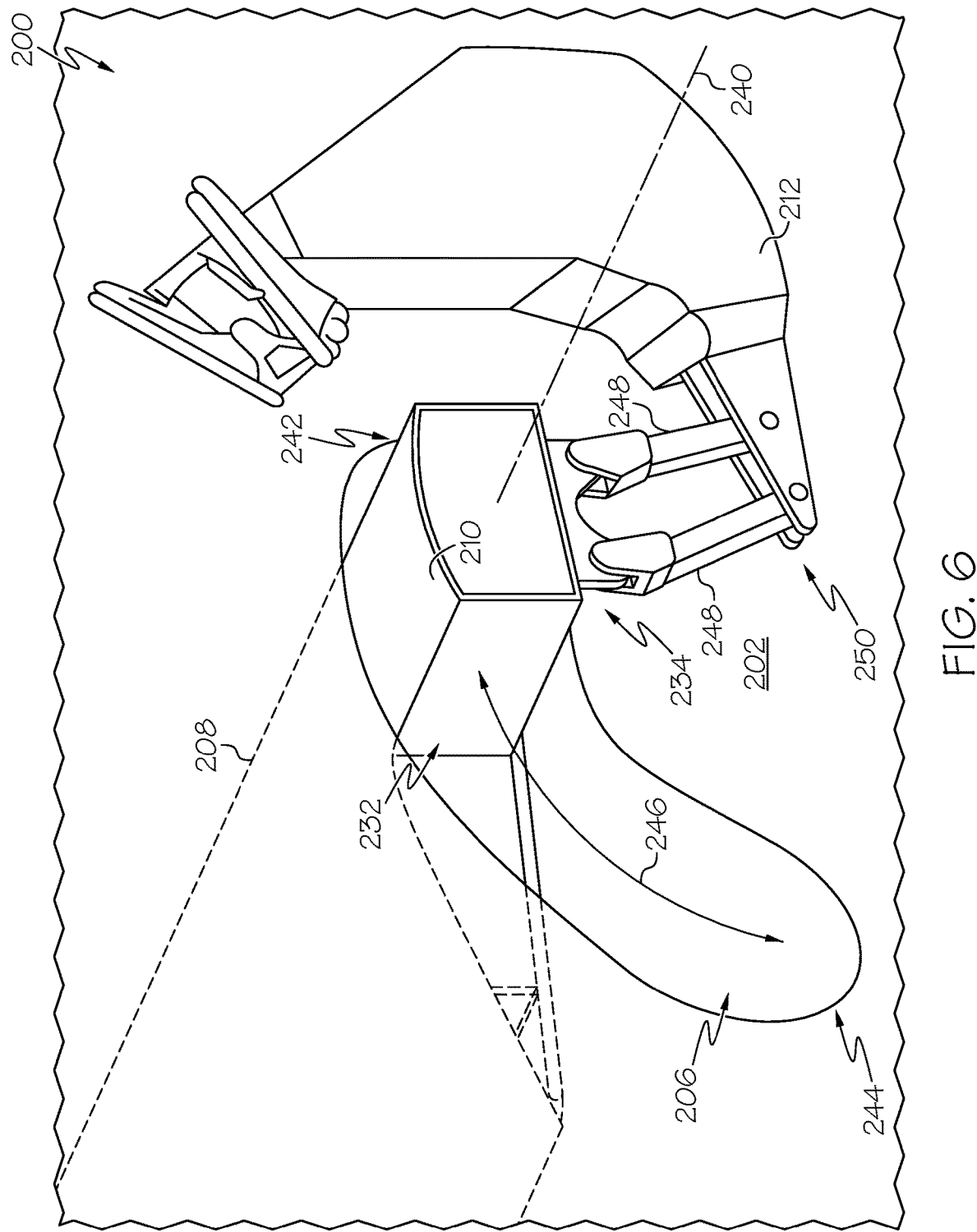
FIG. 6 is a schematic, interior perspective view of an example of a portion of the aircraft showing the torque member extending through the opening in the aircraft.
Figure 7:
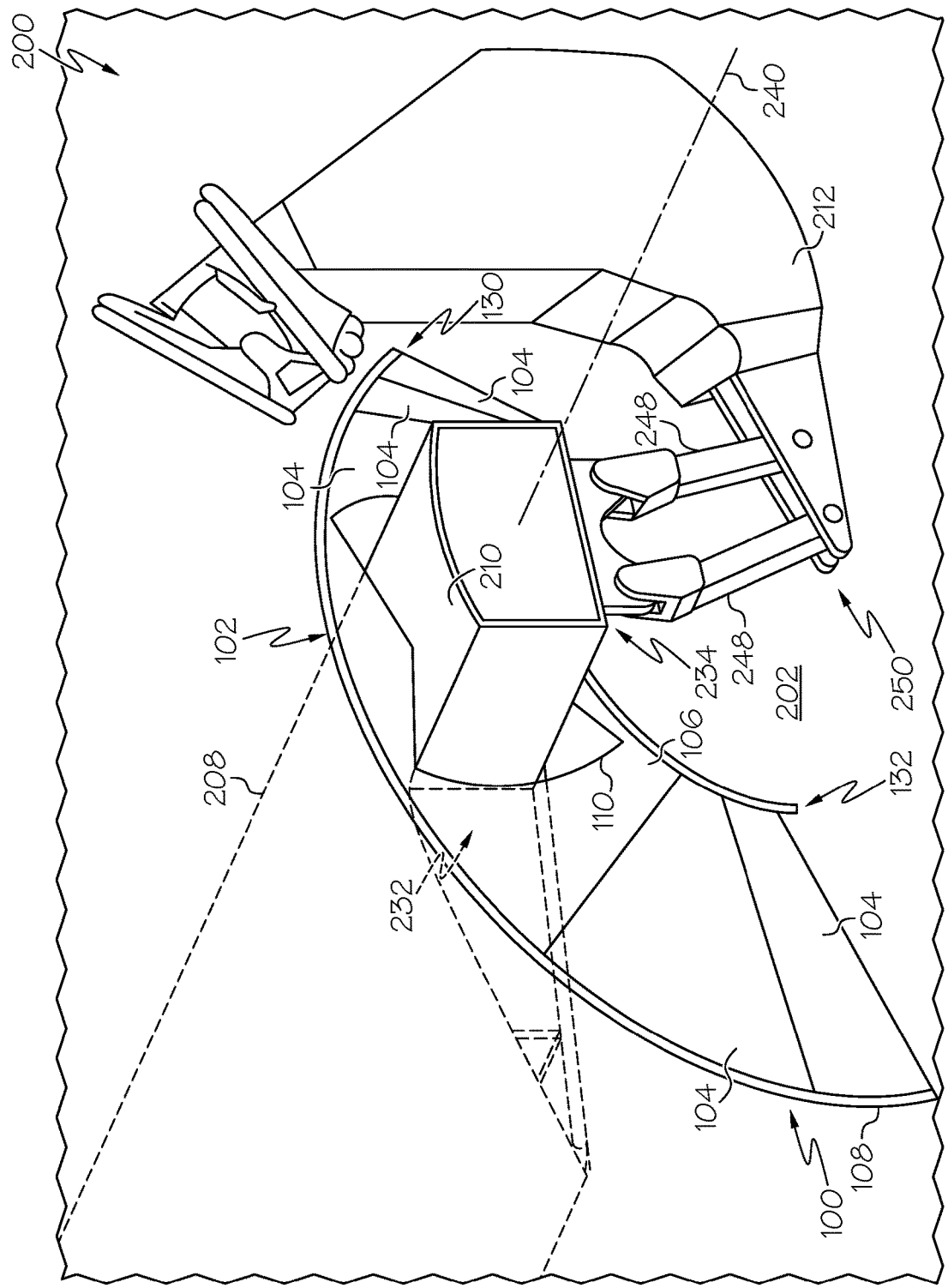
FIG. 7 is a schematic, interior perspective view of the example of the portion of the aircraft of FIG. 6 showing an example of the disclosed apparatus for covering the opening in the aircraft.

In some examples, an outboard (e.g., first) end 232 of the torque member 210 is coupled to or is otherwise integrated with the inboard end 238 of the inboard flap 208. In some examples, an inboard (e.g., second) end 234 of the torque member 210 is coupled to the flap support mechanism 212 (FIGS. 6 and 7). In an example, the torque member 210 includes a mounting flange 236 that is located at the outboard end 232 of the torque member 210 and that is configured to be coupled to the flap support mechanism 212.

FIG. 6 illustrates a partial, interior view of an example of the aircraft 200 showing the torque member 210 extending through the opening 206 in the fuselage 202 and coupled to the flap support mechanism 212. FIG. 6 shows the inboard flap 208 in a generally raised position. In some examples, the torque member 210 rotates about an axis of rotation 240 to pivot or rotate the inboard flap 208 relative to the wing 214 and translates forward and aft along a travel path 246, which may be generally arcuate, to move the inboard flap 208 between a forward/raised position and an aft/lowered position. Thus, in some examples, the opening 206 is elongate and arcuate to enable a full range of motion for the torque member 210 and the associated inboard flap 208 during operation. In some examples, the flap support mechanism 212 includes a carrier mechanism 250, which is also commonly referred to as a carrier beam. The carrier mechanism 250 is coupled to the inboard end 234 of the torque member 210 and transfers motion to the torque member 210 during actuation of the flap support mechanism 212. In some examples, the carrier mechanism 250 includes one or more link members 248. In the illustrative example, the carrier mechanism 250 includes two (2) link members 248 defining four (4) hinged joints to enable rotational and translational movement of the torque member 210, in which an instantaneous center of rotation of the torque member 210 varies along the travel path 246.

The present disclosure recognizes and takes into account that openings in the fuselage of the aircraft are generally undesirable during flight. Accordingly, it is desirable to cover the opening in a manner that accommodates operations of the inboard flap, as described above, and that keeps the opening covered throughout the motion of the inboard flap.

Referring generally to FIGS. 7-20, disclosed is an apparatus 100 for covering the opening 206 in the aircraft 200. The apparatus 100 is configured to enable a full range of motion of the torque member 210 and the inboard flap 208 while substantially covering the opening 206 throughout operational motion of the inboard flap 208.

Figure 8:
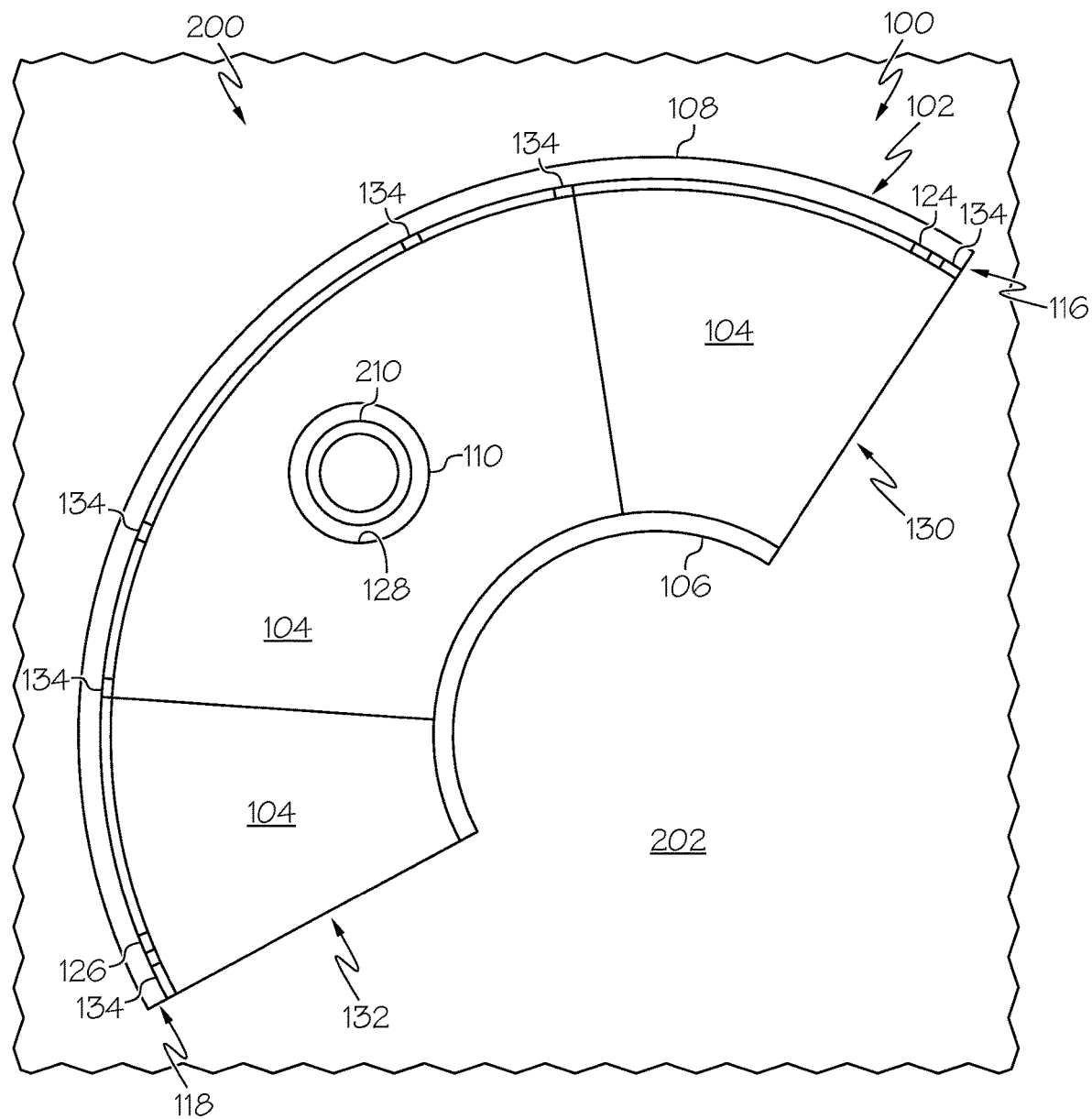
FIG. 8 is a schematic, interior, elevation view of a portion of the aircraft showing an example of the disclosed apparatus.
Figure 9:
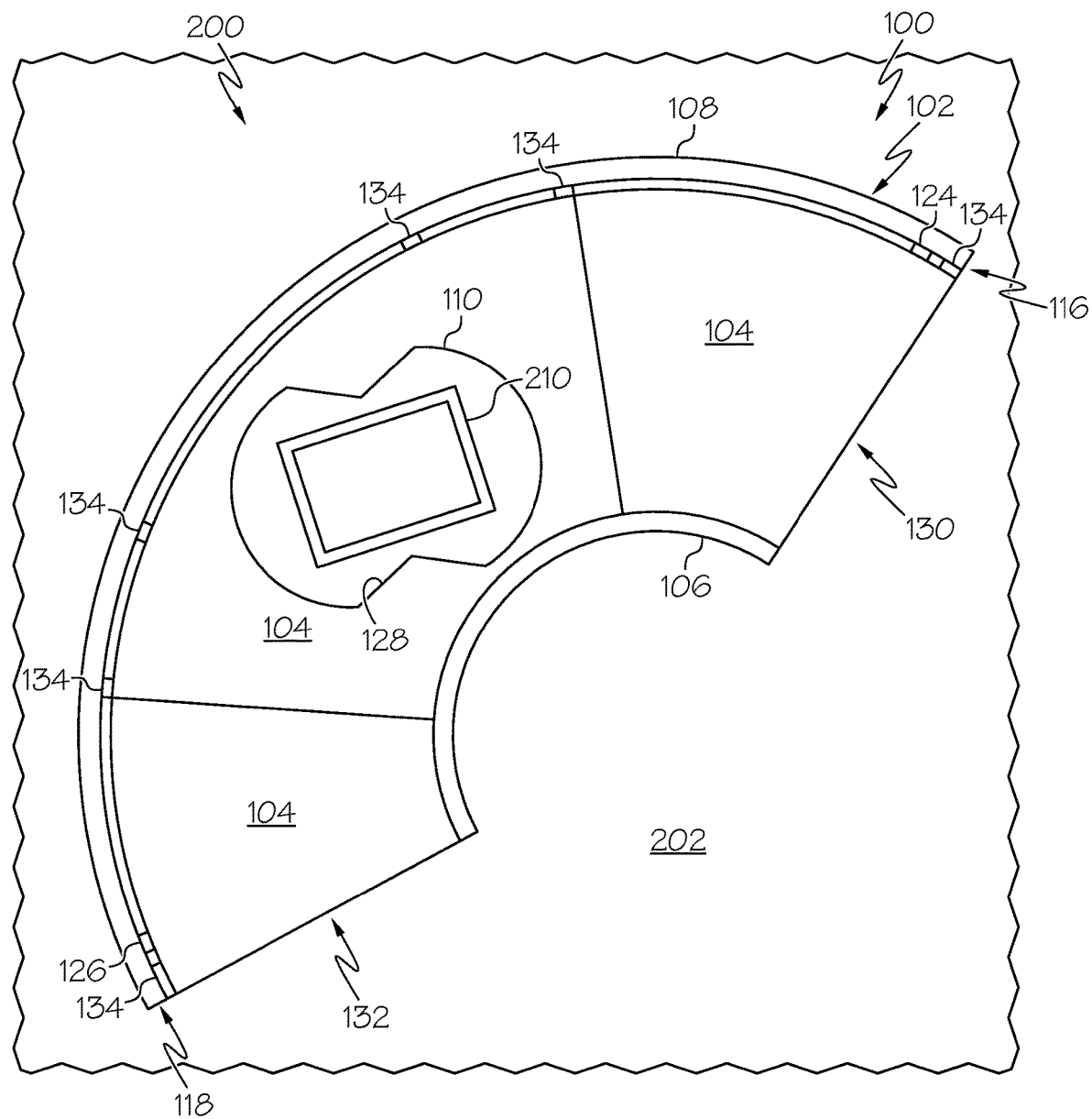
FIG. 9 is a schematic, interior, elevation view of a portion of the aircraft showing an example of the disclosed apparatus.

In an example, the apparatus 100 includes a track 102 and a plurality of panels 104 (referred to individually as panel 104 and collectively as panels 104) that is coupled to the track 102. At least one of the panels 104 is movable along the track 102 relative to an adjacent one of the panels 104 between a first, or forward, position and a second, or aft, position. The track 102 supports the panels 104 and enables movement of one or more of the panels 104 along the track 102. The panels 104 are positioned relative to the fuselage 202 and serve as a cover for the opening 206 (FIG. 6). Examples of the apparatus 100 having three (3) panels 104 are illustrated in FIGS. 8 and 9. Examples of the apparatus 100 having seven (7) panels 104 are illustrated in FIGS. 10-15. Examples of the apparatus 100 having five (5) panels 104 are illustrated in FIGS. 16-19.

Referring to FIG. 7, in some example, the apparatus 100 is mounted on one of an interior or an exterior of the aircraft 200 relative to the opening 206 (FIG. 6) to position the panels 104 adjacent to the opening 206. In some examples, the track 102 is coupled to the fuselage 202, the fuselage/wing fairing 220, or another structural component of the airframe 222 of the aircraft 200. Unless otherwise stated herein, throughout the following disclosure, reference to the fuselage 202 may also include the fuselage/wing fairing 220 and/or another structural component of the airframe of the aircraft 200.

In the illustrative example, the track 102 is coupled to an interior of the aircraft 200 to position the panels 104 behind the opening 206. In another example, the track 102 is coupled to an exterior of the aircraft 200 to position the panels 104 in front of the opening 206. Selection of an interior location or exterior location of the apparatus 100 may depend on various factors such as, but not limited to, space constraints, aerodynamic characteristics and effects, and the like. Generally, the apparatus 100 is suitably located to position the panels 104 as close to the opening 206 (in front of or behind) as possible in order to minimize formation of a gap or space between the opening 206 and the panels 104. Reducing or substantially eliminated the gap or space formed between the opening 206 and the panels 104 may improve the aerodynamic characteristics of the apparatus 100.

The apparatus 100 has a first end 130 (may also be referred to as apparatus-first end) and a second end 132 (may also be referred to herein as apparatus-second end), opposite the first end 130. In some examples, with the apparatus 100 coupled to the fuselage 202, the first end 130 is located at an upper and/or forward position that is proximate to (at or near) a first (e.g., upper and/or forward) end 242 (FIG. 6) of the opening 206 (may also be referred to as opening-first end). In some examples, with the apparatus 100 coupled to the fuselage 202, the second end 132 of the apparatus 100 is located at a lower and/or aft position that is proximate to a second (e.g., lower and/or aft) end 244 (FIG. 6) of the opening 206 (may also be referred to as opening-second end).

Referring to FIGS. 8 and 9, in an example, the apparatus 100 also includes an aperture 110 formed through one of the panels 104. At least the panel 104 having the aperture 110 is movable along the track 102. As illustrated in FIGS. 7-9, the aperture 110 is configured to receive the torque member 210, which is coupled at the outboard end 232 (FIG. 7) to the inboard flap 208 and is coupled at the inboard end 234 (FIG. 7) to the flap support mechanism 212.

In some examples, the aperture 110 is configured to enable the torque member 210 to at least partially rotate about the axis of rotation 240 (FIGS. 6 and 7) relative to the panel 104 as the torque member 210 moves along the travel path 246 (FIG. 6) during actuation of the inboard flap 208 (e.g., movement between the raised and lowered positions). Rotation of torque member 210 enables the inboard flap 208 to pivot about the axis of rotation 240 during actuation of the inboard flap 208. Therefore, in some examples, the axis of rotation 240 defines the pivot axis of the inboard flap 208. In an example, the axis of rotation 240 is a central longitudinal axis of the torque member 210.

The aperture 110 may have any one of various two-dimensional shapes, as viewed along the axis of rotation 240 (FIG. 7). The shape of the aperture 110 is formed by an edge 128 of the panel 104 that defines the aperture 110. In some examples, the aperture 110 has a simple shape, such as circular, square, rectangular, triangular, elliptical, and the like. In an example, the shape of the aperture 110 closely matches the cross-sectional shape of the torque member 210. In the illustrative example of FIG. 8, the aperture 110 has a generally circular shape that matches the circular cross-sectional shape of the torque member 210. In some examples, the aperture 110 has a complex shape, such as those including parts of one or more simple shapes. In another example, the shape of the aperture 110 does not match the cross-sectional shape of the torque member 210. In the illustrative example of FIG. 9, the aperture 110 has a complex shape formed by a circular shape having two, generally opposed triangular shapes removed from the circular shape (e.g., formed by a first curved portion of the edge 128, a first straight portion of the edge 128 extending from an end of the first curved portion, a second straight portion of the edge 128 extending from an end of the first straight portion, a second curved portion of the edge 128 extending from an end of the second straight portion, a third straight portion of the edge 128 extending from an end of the second curved portion, and a fourth straight portion of the edge 128 extending from and end of the third straight portion and terminating at an opposed end of the first curved portion). In some examples, aperture 110 is suitably sized to position the edge 128 forming the aperture 110 proximate to, or as close as possible with, an exterior surface of the torque member 210 to minimize formation of a gap or space between the panel 104 and the torque member 210. Reducing or substantially eliminated the gap or space formed between the panel 104 and the torque member 210 may improve the aerodynamic characteristics of the apparatus 100.

In some examples, the track 102 includes a first rail 106 and a second rail 108. In some examples, one or both of the first rail 106 and the second rail 108 is coupled to the fuselage 202. The first rail 106 and the second rail 108 are spaced apart or are spaced away from one another. The panels 104 extend between the first rail 106 and the second rail 108. In some examples, the panels 104 are coupled to one or both of the first rail 106 and the second rail 108. In some examples, at least one of the panels 104 is movable along the first rail 106 and the second rail 108.

In some examples, the first rail 106 and the second rail 108 are parallel to one another. As used herein, the term "parallel" has its ordinary meaning as known to those skilled in the art and refers to a first line, extending longitudinally through the first rail 106, and a second line, extending longitudinally through the second rail 108, sharing a common plane and the first line and the second line being equidistant from one another. As used herein, the term "parallel" includes exactly parallel and approximately parallel (i.e., close to parallel that still performs the desired function or achieves the desired result).

In some examples, each one of the first rail 106 and the second rail 108 is curved, or has an arcuate profile in a longitudinal direction. In some examples, the first rail 106 and the second rail 108 share a common center of curvature. As the at least one panel 104 moves along the track 102, during actuation of the inboard flap 208, the at least one panel 104 partially orbitally revolves about the common center of curvature of the first rail 106 and the second rail 108. In some examples, the first line, extending longitudinally through the first rail 106, and the second line, extending longitudinally through the second rail 108, have a curvature substantially matching the curvature of the travel path 246 (FIG. 6) of the torque member 210, which is arcuate. In examples where the first rail 106 and the second rail 108 are curved, the first rail 106 may be referred to as an inner rail, which is closest to the center of curvature, and the second rail 108 may be referred to as an outer rail, which is farthest from the center of curvature.

In some examples, the apparatus 100 includes a plurality of carrier mechanisms 134 (referred to individually as carrier mechanism 134 and collectively as carrier mechanisms 134). The carrier mechanisms 134 support the panels 104 and enable the panels 104 to move along the track 102. In an example, each one of the panels 104 includes one or more carrier mechanism 134. In an example, the carrier mechanism 134 is a roller that is coupled to an end of the panel 104 and that is retained by and is movable along a flanged groove formed in the first rail 106 and/or the second rail 108.

Referring to FIG. 10-15, in some examples, the track 102 has a first end 116 (may also be referred to herein as track-first end) that at least partially defines the first end 130 of the apparatus 100 and a second end 118 (may also be referred to herein as track-second end) that at least partially defines the second end 132 of the apparatus 100. Similarly, each one of the first rail 106 and the second rail 108 have an associated first end and second end that define the first end 116 and the second end 118 of the track 102.

In some examples, the plurality of panels 104 includes a first panel 104A (may also be referred to as a first end panel) that is located proximate to the first end 116 of the track 102, a second panel 104B (may also be referred to as a second end panel) that is located proximate to the second end 118 of the track 102, and a third panel 104C (may also be referred to as a center panel) that is located between the first panel 104A and the second panel 104B. The third panel 104C is movable along the track 102 relative to the first panel 104A and the second panel 104B between the first position and the second position. The aperture 110 is formed in the third panel 104C. The aperture 110 in the third panel 104C is configured to receive the torque member 210 that is coupled at one end (e.g., the outboard end 232) to the flap 208 of the aircraft 200 and at another end (e.g., the inboard end 234) to the flap support mechanism 212.

In some examples, the plurality of panels 104 also includes a two (2) or more intermediate panels located between the center panel and the end panels. In an example, the plurality of panels 104 (e.g., the intermediate ones of the panels 104) includes a first intermediate panel 104D that is located between the first panel 104A and the third panel 104C and a second intermediate panel 104E that is located between the second panel 104B and the third panel 104C. The first intermediate panel 104D is movable along the track 102 with the third panel 104C as the third panel 104C translates along the track 102 between the first and second positions. For example, the first intermediate panel 104D may move toward and/or away from the first end 116 and/or the second end 118 of the track 102 with the third panel 104C. The second intermediate panel 104E is movable along the track 102 with the third panel 104C as the third panel 104C translates along the track 102 between the first and second positions. For example, the second intermediate panel 104E may move toward and/or away from the first end 116 and/or the second end 118 of the track 102 with the third panel 104C.

In some examples, the plurality of panels 104 includes additional intermediate ones of the panels 104. In an example, the plurality of panels 104 includes a third intermediate panel 104F that is located between the first intermediate panel 104D and the third panel 104C. The third intermediate panel 104F is movable along the track 102 with the third panel 104C and the first intermediate panel 104D as the third panel 104C translates along the track 102 between the first and second positions. For example, the third intermediate panel 104F may move toward and/or away from the first end 116 and/or the second end 118 of the track 102 with the third panel 104C. In an example, the plurality of panels 104 includes a fourth intermediate panel 104G that is located between the second intermediate panel 104E and the third panel 104C. The fourth intermediate panel 104G is movable along the track 102 with the third panel 104C and the second intermediate panel 104E as the third panel 104C translates along the track 102 between the first and second positions. For example, the fourth intermediate panel 104G may move toward and/or away from the first end 116 and/or the second end 118 of the track 102 with the third panel 104C.

Accordingly, during movement of the inboard flap 208 between the raised and lowered positions, at least some of the panels 104 move with respect to each other between an extended condition and a retracted, or collapsed, condition.

Figure 10:
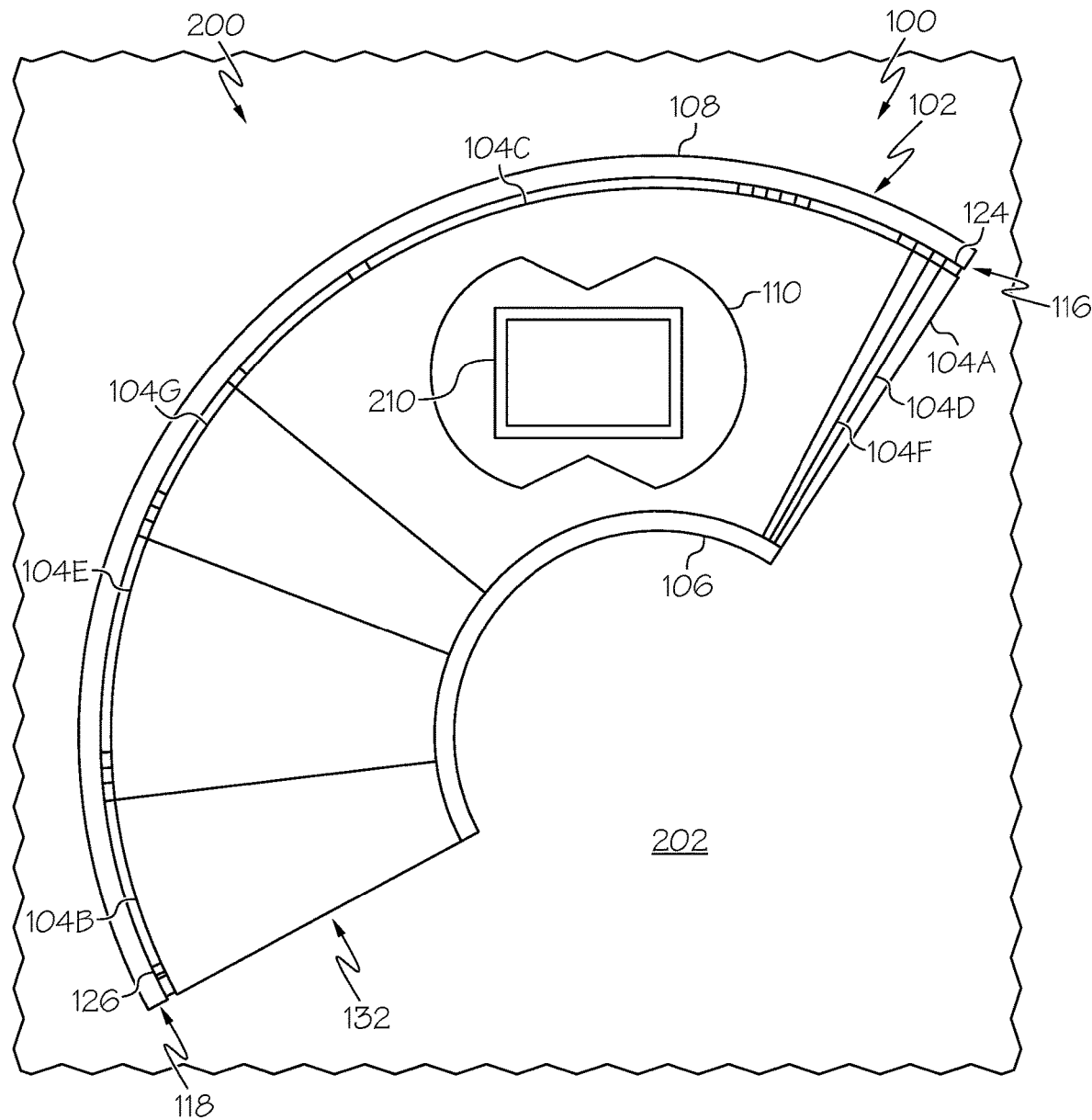
FIG. 10 is a schematic, interior, elevation view of a portion of the aircraft showing an example of the disclosed apparatus in a first position.
Figure 11:
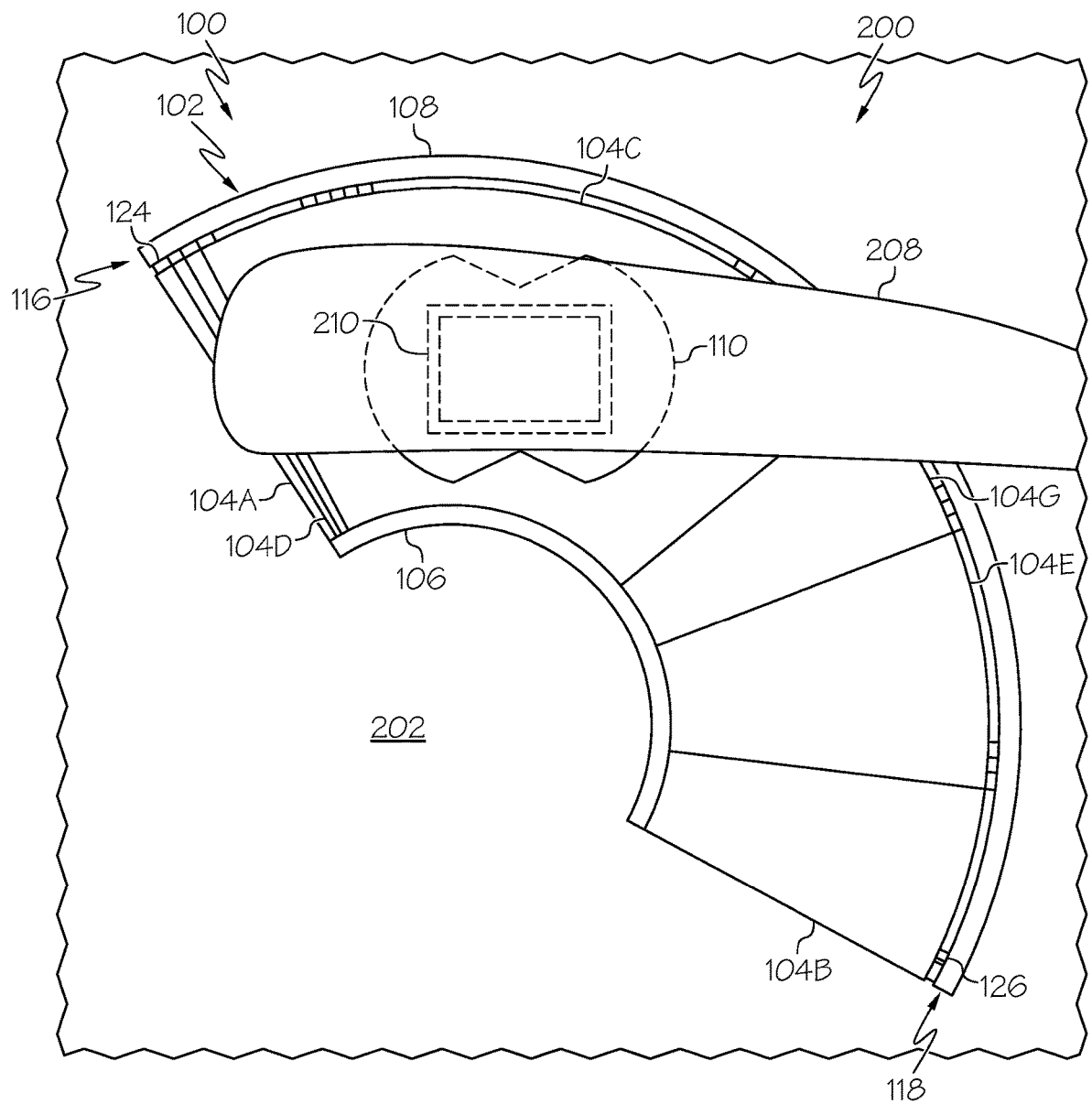
FIG. 11 is a schematic, exterior, elevation view of a portion of the aircraft showing an example of the disclosed apparatus in the first position.

FIGS. 10 and 11 show an example of the disclosed apparatus 100 in the first, or forward, position. In an example, with the inboard flap 208 (FIG. 11) in the raised position, the third panel 104C is in the first position (e.g., located toward the first end 116 of the track 102). With the third panel 104C in the first position, the first panel 104A, the first intermediate panel 104D, and the third intermediate panel 104F are collapses, or collected, at the first end 116 of the track 102, to occupy a reduced coverage area. With the third panel 104C in the first position, the second panel 104B, the second intermediate panel 104E, and the fourth intermediate panel 104G are extended to occupy an increased coverage area. Accordingly, in the first position, the second panel 104B, the second intermediate panel 104E, the fourth intermediate panel 104G, and the third panel 104C cover the opening 206 (FIG. 6) in the aircraft 200.

Figure 12:
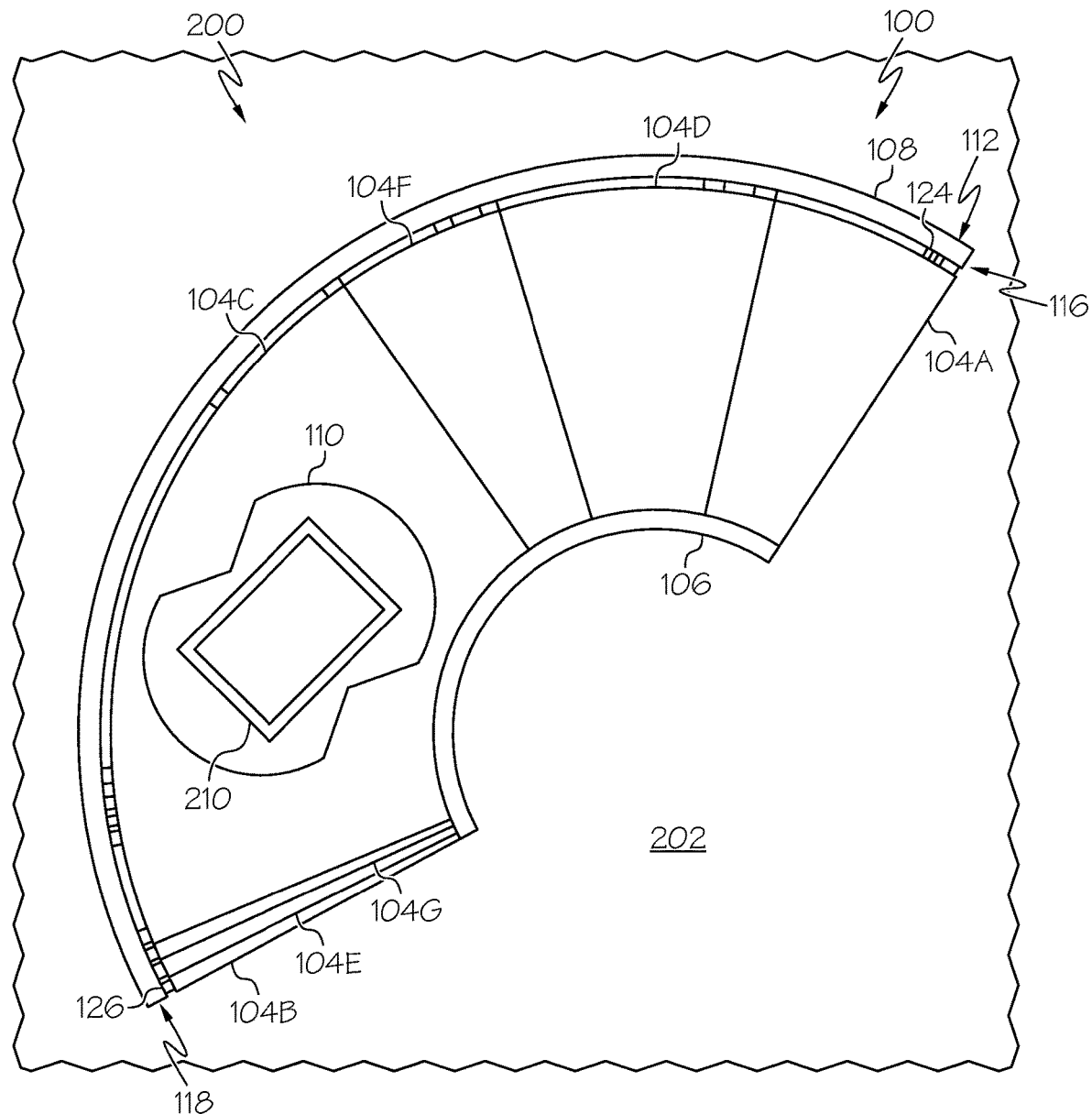
FIG. 12 is a schematic, interior, elevation view of a portion of the aircraft showing an example of the disclosed apparatus in a second position.
Figure 13:
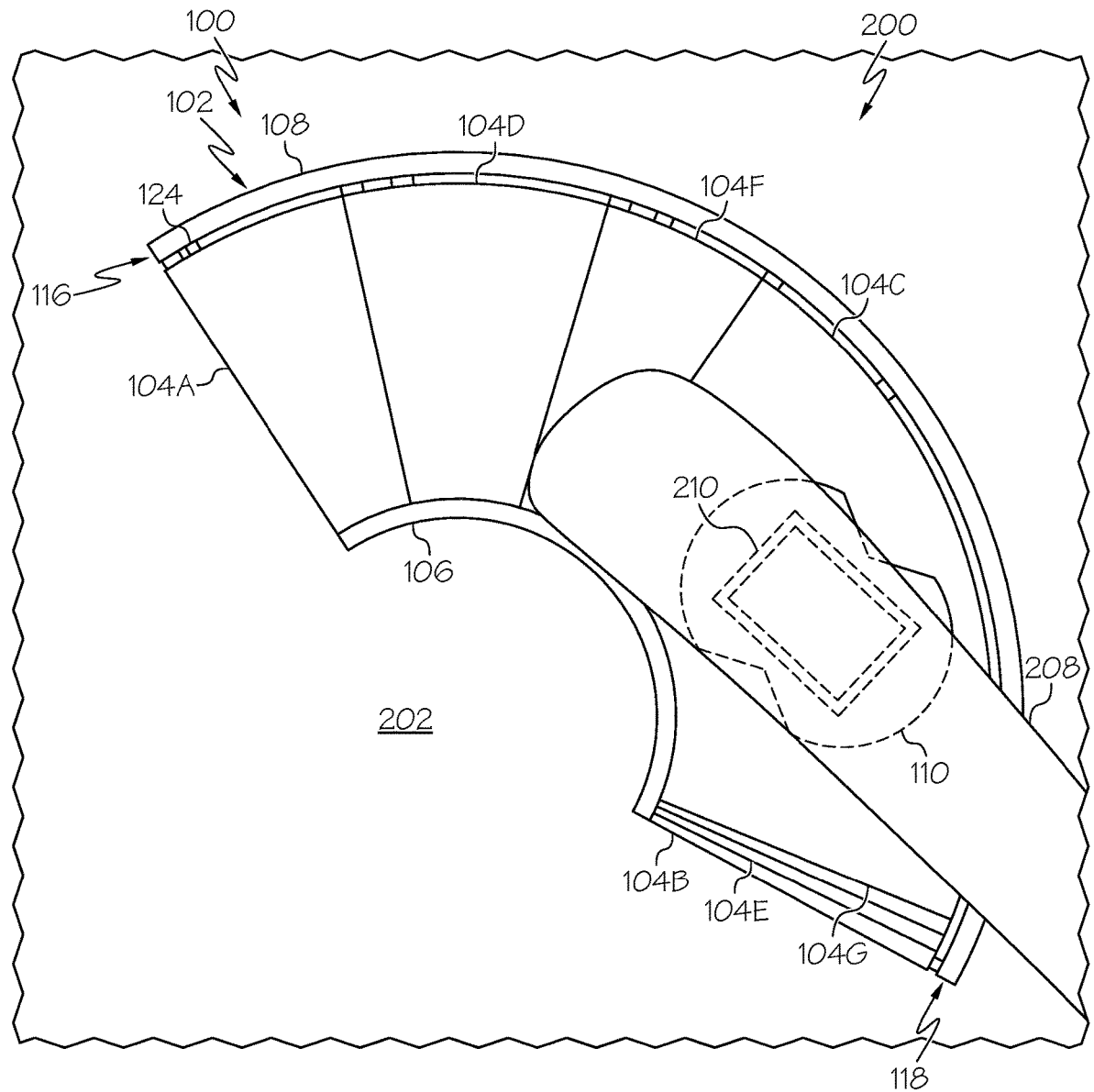
FIG. 13 is a schematic, exterior, elevation view of a portion of the aircraft showing an example of the disclosed apparatus in the second position.

FIGS. 12 and 13 show an example of the disclosed apparatus 100 in the second, or aft, position. In an example, with the inboard flap 208 (FIG. 13) in the lowered position, the third panel 104C is in the second position (e.g., located toward the second end 118 of the track 102). With the third panel 104C in the second position, the second panel 104B, the second intermediate panel 104E, and the fourth intermediate panel 104G are collapses, or collected, at the second end 118 of the track 102, to occupy a reduced coverage area. With the third panel 104C in the second position, the first panel 104A, the first intermediate panel 104D, and the third intermediate panel 104F are extended to occupy an increased coverage area. Accordingly, in the second position, the first panel 104A, the first intermediate panel 104D, the third intermediate panel 104F, and the third panel 104C cover the opening 206 (FIG. 6) in the aircraft 200.

Figure 14:
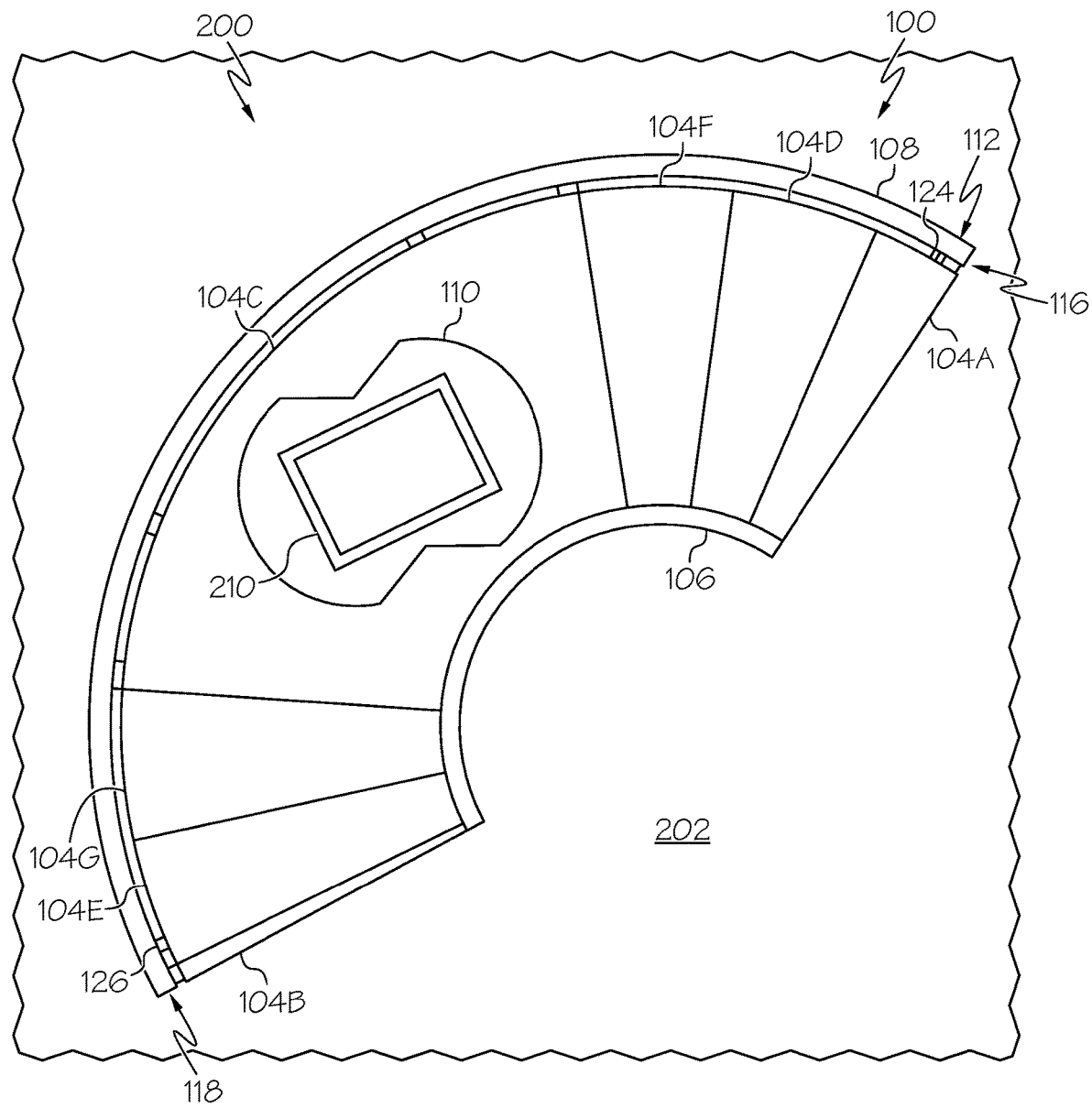
FIG. 14 is a schematic, interior, elevation view of a portion of the aircraft showing an example of the disclosed apparatus in an intermediate position.
Figure 15:
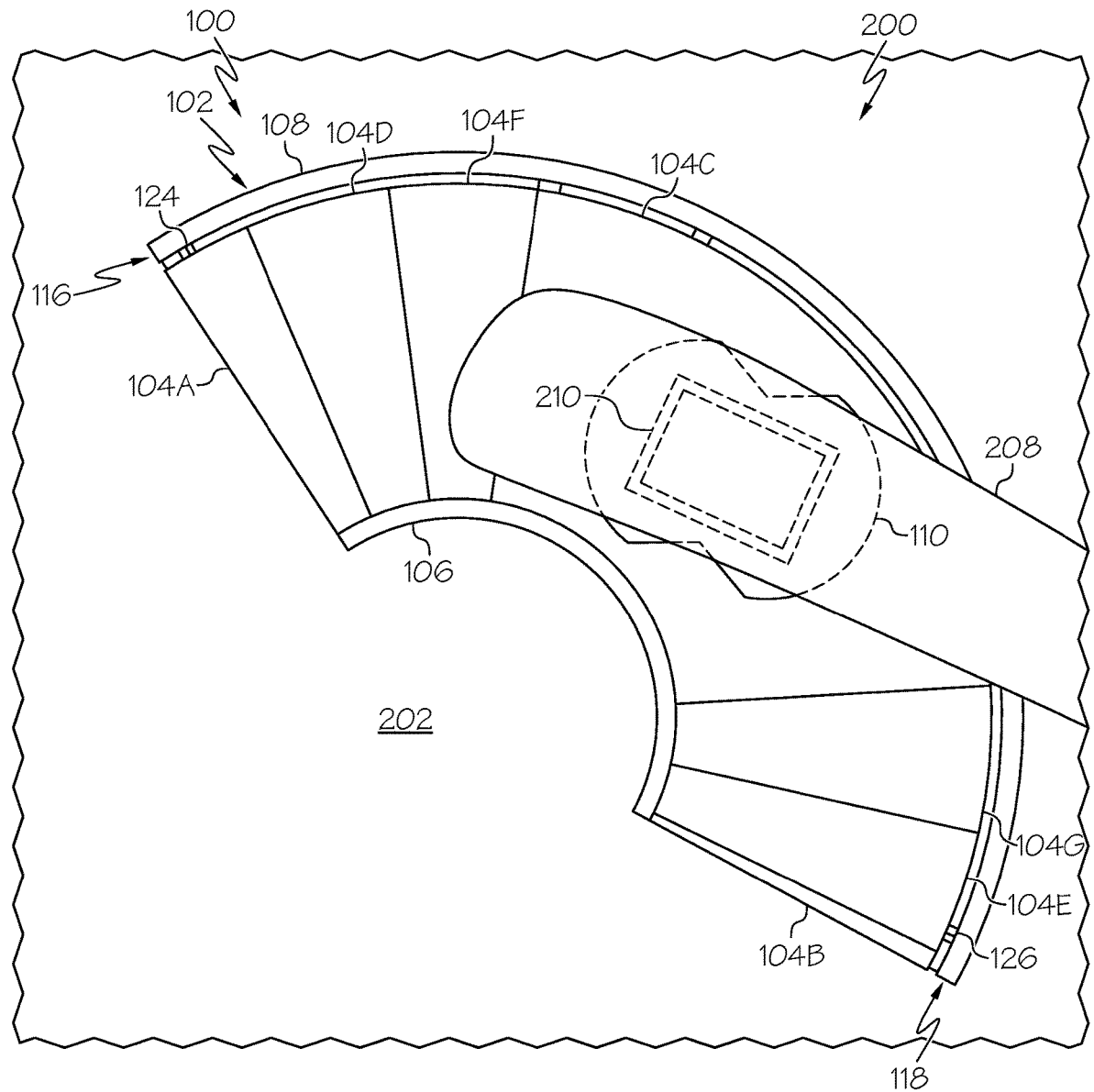
FIG. 15 is a schematic, exterior, elevation view of a portion of the aircraft showing an example of the disclosed apparatus in the intermediate position.

FIGS. 14 and 15 show an example of the disclosed apparatus 100 in an intermediate position (one of a plurality of intermediate positions) between the first position and the second position. In an example, with the inboard flap 208 (FIG. 13) in an intermediate position between the raised and lowered positions, the third panel 104C is in the intermediate position (e.g., located between the first end 116 and the second end 118 of the track 102). With the third panel 104C in the intermediate position, the first panel 104A, the first intermediate panel 104D, and the third intermediate panel 104F are partially collapsed (or are partially extended) to occupy an intermediate coverage area. With the third panel 104C in the intermediate position, the second panel 104B, the second intermediate panel 104E, and the fourth intermediate panel 104G are partially collapsed (or are partially extended) to occupy an intermediate coverage area. Accordingly, in the intermediate position, the first panel 104A, the first intermediate panel 104D, the third intermediate panel 104F, the third panel 104C, the second panel 104B, the second intermediate panel 104E, and the fourth intermediate panel 104G cover the opening 206 (FIG. 6) in the aircraft 200.

In the examples illustrated in FIGS. 10-15, the apparatus 100 includes four (4) of the intermediate ones of the panels 104 (e.g., first intermediate panel 104D, second intermediate panel 104E, third intermediate panel 104F, and fourth intermediate panel 104G). In other examples, the apparatus 100 may include fewer or more of the intermediate ones of the panels 104, in which the apparatus 100 functions substantially the same as described herein and has the desired function and achieves the desired result of covering the opening 206. Therefore, the total number of the intermediate ones of the panels 104 may vary depending, for example, on one or more of the size of the apparatus 100, the size of the opening 206, the radius of curvature of the first rail 106 and the second rail 108, the size of each individual one of the panels 104, and the range of motion of each individual one of the panels 104.

FIGS. 10-15 illustrate movement of the torque member 210 within the opening 206 along the travel path 246 (FIG. 6). As shown in FIGS. 11, 13, and 14, actuation of the inboard flap 208 between the raised and lowered positions moves the inboard flap 208 along an arcuate path between an upper and forward position and a lower and aft position. FIGS. 10-15 also illustrate rotation of the torque member 210 about the axis of rotation 240 (FIGS. 6 and 7) relative to the third panel 104C within the aperture 110. As shown in FIGS. 11, 13, and 14, actuation of the inboard flap 208 between the raised and lowered positions also pivots the inboard flap 208 relative to the wing 214 (FIG. 1). The wing 214 is not shown in FIGS. 11, 13, and 14 for clarity of illustration. While not shown, in some examples, the inboard flap 208 may also be pivotally coupled with the wing 214.

In some examples, at least one of the first panel 104A and/or the second panel 104B is fixed to the track 102. In some examples, each one of the first panel 104A and the second panel 104B is fixed to the track 102. In an example, the first panel 104A is fixed to the track 102 proximate to the first end 116 of the track 102 and is not movable along the track 102. In an example, the second panel 104B is fixed to the track 102 proximate to the second end 118 of the track 102 and is not movable along the track 102.

In some examples, the first panel 104A is movable along the track 102. For example, the first panel 104A may move toward and/or away from the first end 116 and/or the second end 118 of the track 102 with the third panel 104C. In some examples, the second panel 104B is movable along the track 102. For example, the second panel 104B may move toward and/or away from the first end 116 and/or the second end of the track 102 with the third panel 104C.

In an example, the apparatus 100 also includes a first stop 124 that is operable to limit movement of the first panel 104A toward the second end 118 of the track 102. In an example, the apparatus 100 also includes a second stop 126 that is operable to limit movement of the second panel 104B toward the first end 116 of the track 102. In an example, the first stop 124 is coupled to one or both the first rail 106 and the second rail 108 proximate to the first end 116 of the track 102. In an example, the second stop 126 is coupled to one or both of the first rail 106 and the second rail 108 proximate to the second end 118 of the track 102. The first stop 124 and the second stop 126 may include any structure that physically impedes or prevents motion of the first panel 104A and the second panel 104B, respectively, along the track 102. In an example, the first stop 124 is configured to engage one of the carrier mechanisms 134 associated with the first panel 104A and the second stop 126 is configured to engage one of the carrier mechanisms 134 associated with the second panel 104B.

Figure 16:
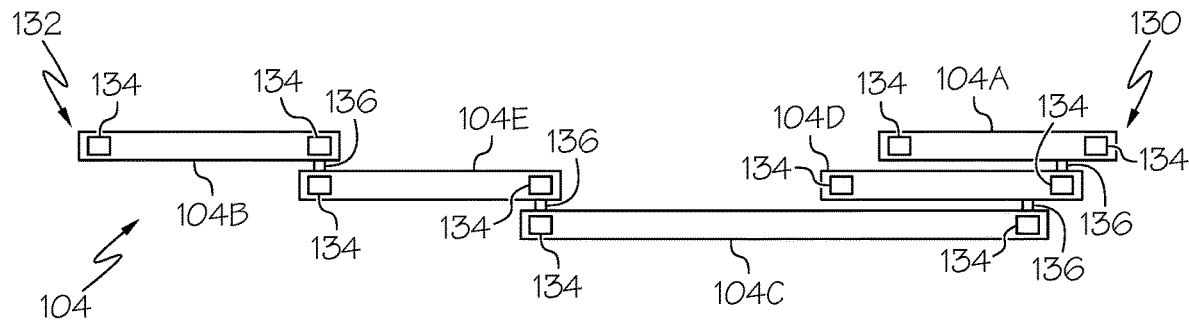
FIG. 16 is a schematic, plan view of an example of a plurality of panels of the disclosed apparatus.
Figure 17:
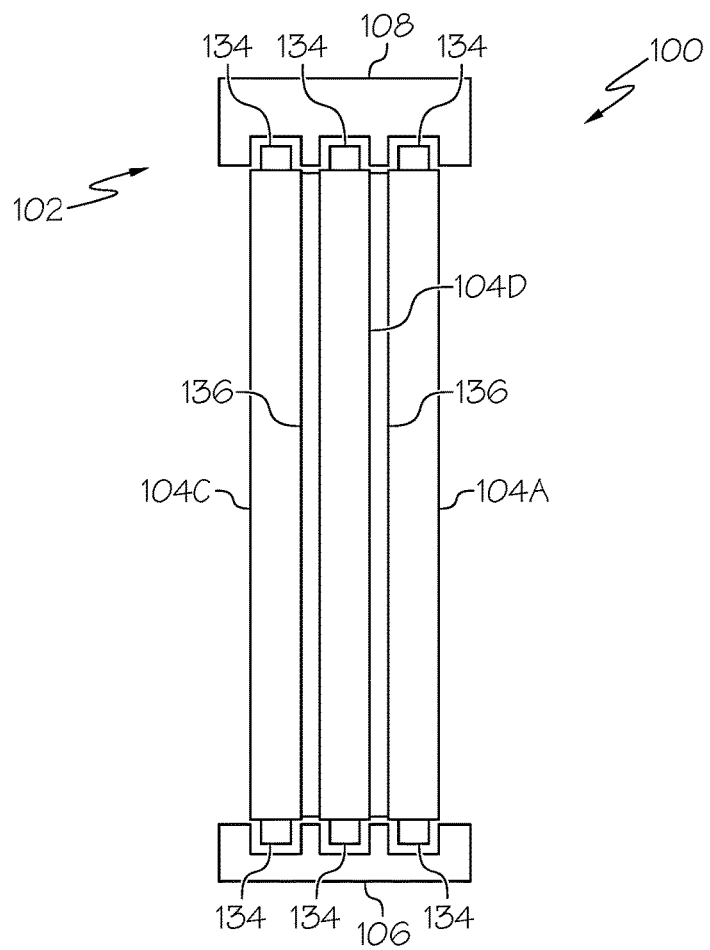
FIG. 17 is a schematic, end view of an example of the disclosed apparatus.

Referring to FIGS. 16 and 17, in some examples, each one of the panels 104 is a single-walled structure. In some examples, each one of the panels 104 is oriented parallel to an adjacent one of the panels 104. In some examples, each one of the panels 104 is positioned to the side of an adjacent one of the panels 104. In some examples, with ones of the panels 104 in the partially or fully collapsed condition, the ones of the panels 104 are arranged in a stacked configuration.

In an example, with the third panel 104C being positioned between the intermediate position (FIGS. 14 and 15) and the first position (FIGS. 10 and 11), the first panel 104A, the first intermediate panel 104D (and any additional intermediate ones of the panels 104), and the third panel 104C are arranged in a first partially stacked configuration. In an example, with the third panel 104C in the first position, the first panel 104A, the first intermediate panel 104D (and any additional intermediate ones of the panels 104), and the third panel 104C are arranged in a first stacked configuration. In an example, with the third panel 104C being positioned between the intermediate position and the second position (FIGS. 12 and 13), the second panel 104B, the second intermediate panel 104E (and any additional intermediate ones of the panels 104), and the third panel 104C are arranged in a second partially stacked configuration. In an example, with the third panel 104C in the second position, the second panel 104B, the second intermediate panel 104E (and any additional intermediate ones of the panels 104), and the third panel 104C are arranged in a second stacked configuration.

In some examples, at any position of the apparatus 100 during motion of the inboard flap 208 (FIG. 1), at least a portion of each one of the panels 104 overlaps a portion of an adjacent one of the panels 104. As the apparatus 100 moves closer to the first position or the second position, a larger portion of some of the panels 104 overlaps a larger portion of the adjacent one of the panels 104.

In an example, and as illustrated in FIG. 16, with the apparatus 100 in the first position, a major portion of the first intermediate panel 104D overlaps the third panel 104C and a major portion of the first panel 104A overlaps the first intermediate panel 104D. With the apparatus 100 in the first position, a minor portion of the second intermediate panel 104E overlaps the third panel 104C and a minor portion of the second panel 104B overlaps the second intermediate panel 104E. Similarly, in an example, with the apparatus 100 in the second position, a major portion of the second intermediate panel 104E overlaps the third panel 104C and a major portion of the second panel 104B overlaps the second intermediate panel 104E. With the apparatus 100 in the second position, a minor portion of the first intermediate panel 104D overlaps the third panel 104C and a minor portion of the first panel 104A overlaps the first intermediate panel 104D.

As used here, the term "major" refers to greater than 50% of the surface area of the panel 104 associated therewith, such as at least 75%, at least 90%, or 100% of the surface area of the panel 104 associated therewith. As used herein, the term "minor" refers to less than 50% of the surface area of the panel 104 associated therewith, such as less than 25%, less than 10%, or less than 5% of the surface area of the panel 104 associated therewith.

Accordingly, in some examples, with the apparatus 100 in the first position, some of the panels 104 collapse to form an overlapping stacked arrangement collected at the first end 130 of the apparatus 100 and others of the panels 104 extend to completely cover the opening 206. Similarly, in some examples, with the apparatus 100 in the second position, some of the panels 104 collapse to form an overlapping stacked arrangement collected at the second end 132 of the apparatus 100 and others of the panels 104 extend to completely cover the opening 206. Therefore, the apparatus 100 provides a covering for the opening 206 throughout actuation of the inboard flap 208.

Referring to FIGS. 16 and 17, in some examples, each one of the panels 104 is a double-walled structure that includes a first wall and a second wall that is parallel to and is spaced away from the first wall. In some examples, some of the panels 104 are positioned at least partially within (e.g., between the first wall and the second wall of) an adjacent one of the panels 104. In some examples, with ones of the panels 104 in the partially or fully collapsed condition, the ones of the panels 104 are arranged in a nested configuration.

In an example, with the third panel 104C being positioned between the intermediate position (FIGS. 14 and 15) and the first position (FIGS. 10 and 11), the first panel 104A, the first intermediate panel 104D (and any additional intermediate ones of the panels 104), and the third panel 104C are arranged in a first partially nested configuration. In an example, with the third panel 104C in the first position, the first panel 104A, the first intermediate panel 104D (and any additional intermediate ones of the panels 104), and the third panel 104C are arranged in a first nested configuration. In an example, with the third panel 104C being positioned between the intermediate position and the second position (FIGS. 12 and 13), the second panel 104B, the second intermediate panel 104E (and any additional intermediate ones of the panels 104), and the third panel 104C are arranged in a second partially nested configuration. In an example, with the third panel 104C in the second position, the second panel 104B, the second intermediate panel 104E (and any additional intermediate ones of the panels 104), and the third panel 104C are arranged in a second nested configuration.

In some examples, at any position of the apparatus 100 during motion of the inboard flap 208 (FIG. 1), at least a portion of each one of the panels 104 is nested within (e.g., is received between the first wall and the second wall of) a portion of an adjacent one of the panels 104. As the apparatus 100 moves closer to the first position or the second position, a larger portion of some of the panels 104 is nested within the adjacent one of the panels 104.

Figure 18:
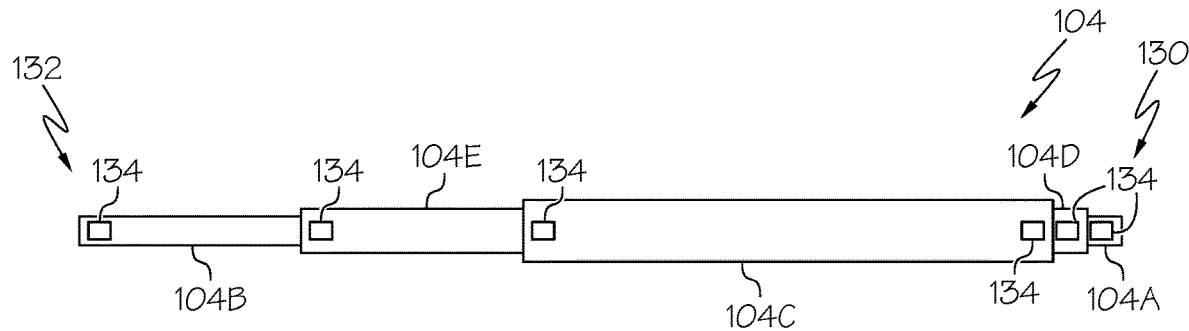
FIG. 18 is a schematic, plan view of an example of the plurality of panels of the disclosed apparatus.
Figure 19:
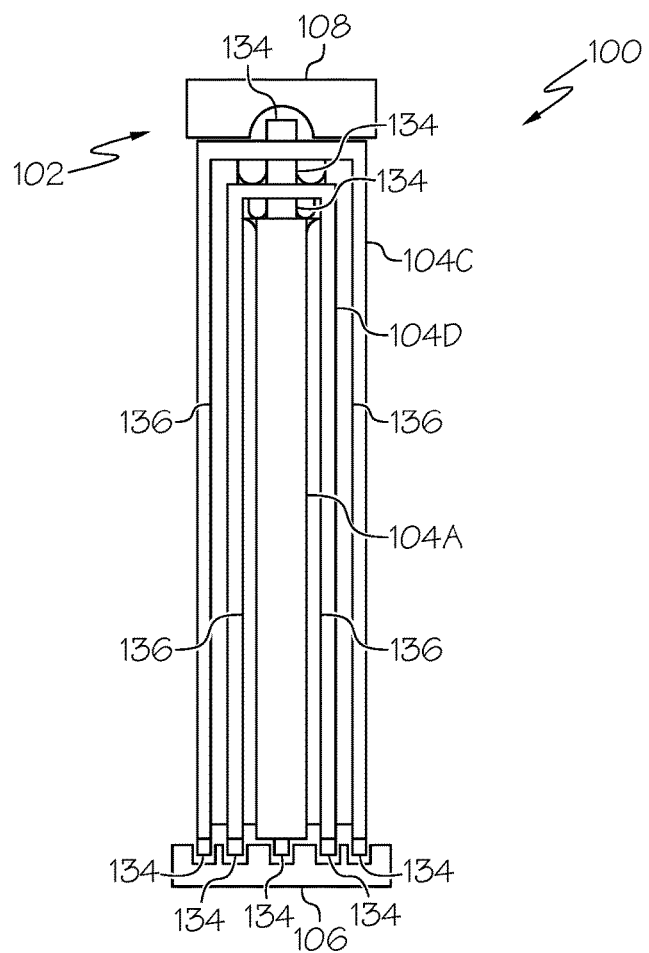
FIG. 19 is a schematic, end view of an example of the disclosed apparatus.

In an example, and as illustrated in FIG. 18, with the apparatus 100 in the first position, a major portion of the first intermediate panel 104D is nested within the third panel 104C and a major portion of the first panel 104A is nested within the first intermediate panel 104D. With the apparatus 100 in the first position, a minor portion of the second intermediate panel 104E is nested within the third panel 104C and a minor portion of the second panel 104B is nested within the second intermediate panel 104E. Similarly, in an example, with the apparatus 100 in the second position, a major portion of the second intermediate panel 104E is nested within the third panel 104C and a major portion of the second panel 104B is nested within the second intermediate panel 104E. With the apparatus 100 in the second position, a minor portion of the first intermediate panel 104D is nested within the third panel 104C and a minor portion of the first panel 104A is nested within the first intermediate panel 104D.

Accordingly, in some examples, with the apparatus 100 in the first position, some of the panels 104 collapse to form an overlapping nested arrangement collected at the first end 130 of the apparatus 100 and others of the panels 104 extend to completely cover the opening 206. Similarly, in some examples, with the apparatus 100 in the second position, some of the panels 104 collapse to form an overlapping nested arrangement collected at the second end 132 of the apparatus 100 and others of the panels 104 extend to completely cover the opening 206. Therefore, the apparatus 100 provides a covering for the opening 206 throughout actuation of the inboard flap 208.

Referring to FIGS. 16-19, in some examples, each one of the panels 104 is positioned or arranged as close as possible to an adjacent one of the panels 104 in order to minimize the formation of a gap or space between adjacent ones of the panels 104. Reducing or substantially eliminated the gap or space formed between the adjacent ones of the panels 104 may improve the aerodynamic characteristics of the apparatus 100.

In some examples, the apparatus 100 includes a seal 136 that is located between the adjacent ones of the panels 104. The seal 136 is configured to close any gap or space formed between the adjacent ones of the panels 104. The seal 136 being located between the adjacent ones of the panels 104 may improve the aerodynamic characteristics of the apparatus 100.

In some examples, side edges of each one of the panels 104 are chamfered or are otherwise rounded. Providing chamfered edges to the sides of the panels 104 may improve the aerodynamic characteristics of the apparatus 100.

In some examples, each one of the panels 104 includes an engagement feature operable to engage and act on an adjacent one of the panels. The engagement feature slidably links each one of the panels 104 with the adjacent one of the panels 104. Engagement between adjacent ones of the panels 104 by the engagement feature at a certain position along the travel path of the one of the panels 104 moves the adjacent one of the panels 104.

The panels 104 may have any suitable size, any two-dimensional shape viewed from the side, any cross-sectional shape, and/or any profile shape viewed from an end. In the illustrative examples, the panels 104 have a flat profile shape. In some other examples, the panels 104 have a curved profile shape along one or more dimension. In the illustrative examples in which the first rail 106 and the second rail 108 are curved, each of the panels 104 has a wedge-shape that has a wide end, which is coupled to the second rail 108, and that tapers toward a narrow end, which is coupled to the first rail 106. In this example, the wide end of the panel 104 is curved to match the curvature of the second rail 108 and the narrow end is curved to match the curvature of the first rail 106.

Figure 20:
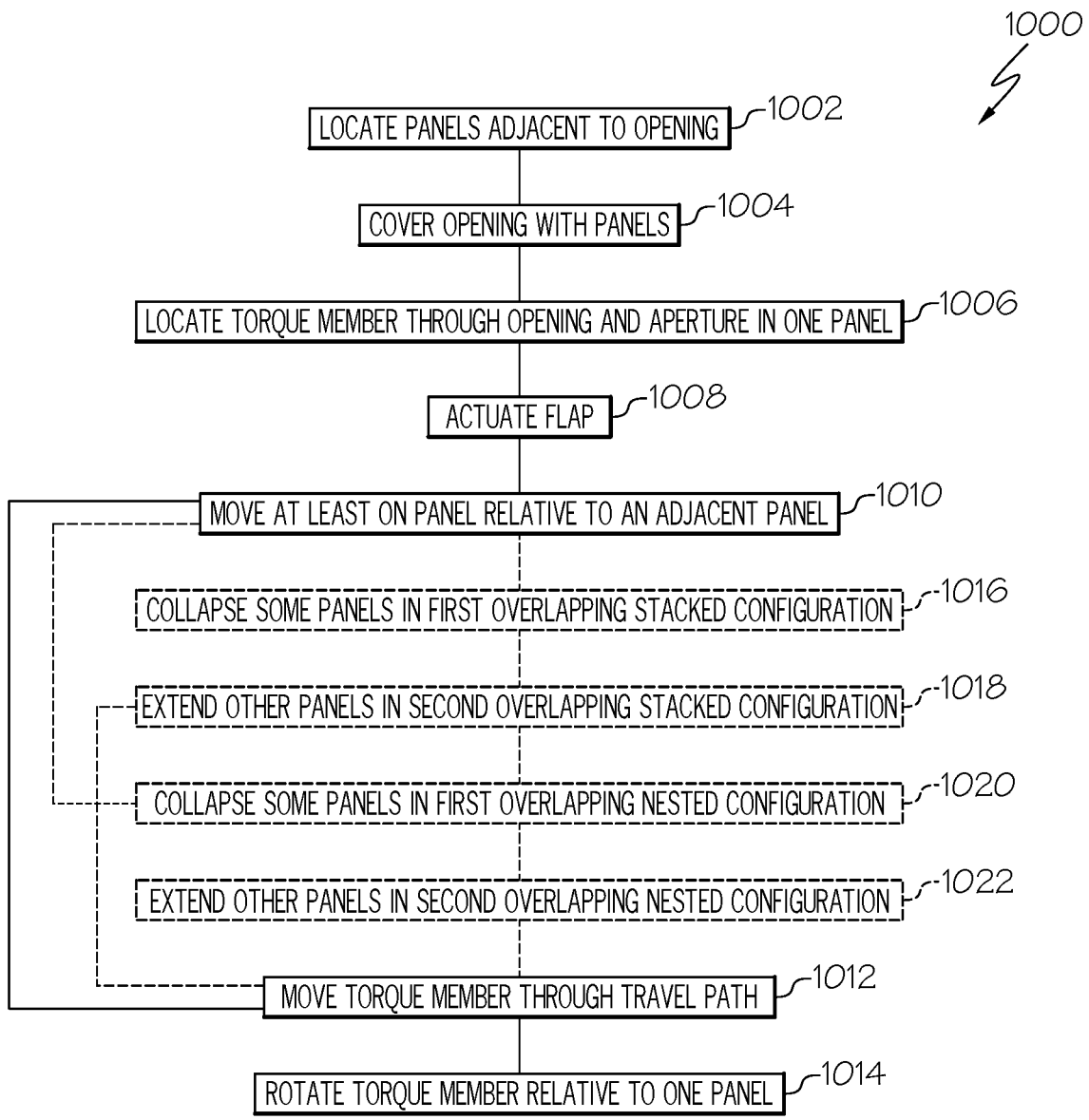
FIG. 20 is a flow diagram of an example of a disclosed method for covering an opening in an aircraft.

Referring to FIG. 20, also disclosed is an example method 1000 for covering the opening 206 in the fuselage 202 of the aircraft 200 using the disclosed apparatus 100. In an example, the method 1000 includes a step of locating a plurality of the panels 104 adjacent to the opening 206, as shown at block 1002. In an example, the method 1000 also includes a step of covering the opening 206 with the plurality of the panels 104, as shown at block 1004. In an example, the method 1000 also includes a step of locating (e.g., extending) the torque member 210 through the opening 206 in the aircraft 200 and through the aperture 110 in one of the panels 104 that is aligned with the opening 206, as shown at block 1006. In an example, the method 1000 also includes a step of actuating the inboard flap 208 by moving the inboard flap 208 between a first (raised) position (FIG. 11) and a second (lowered) position (FIG. 13), as shown at block 1008. In an example, the method 1000 also includes a step of moving at least one of the panels 104 relative to an adjacent one of the panels 104 during actuation of the inboard flap 208 (e.g., as the inboard flap 208 moves between the first position and the second position), as shown at block 1010.

In an example, the method 1000 also includes a step of moving the torque member 210, which is coupled to the inboard flap 208, through the arcuate path as the inboard flap 208 moves between the first position and the second position, as shown at block 1012. In an example, the method 1000 also includes a step of rotating the torque member 210 relative to the one of the panels 104 as the torque member 210 moves through the travel path 246 (FIG. 6), which is arcuate, as shown at block 1014.

Referring to FIGS. 10 and 11, in an example, as the inboard flap 208 moves to the first (raised) position, the torque member 210 moves the third panel 104C toward the first end 116 of the track 102. As the third panel 104C moves toward the first end 116 of the track 102, the first intermediate panel 104D and the third intermediate panel 104F move toward the first end 116 of the track 102 with the third panel 104C. Thus, in an example, the first panel 104A, the first intermediate panel 104D, and the third intermediate panel 104F collapse, or collect, at the first end 116 of the track 102, to occupy a reduced coverage area that covers a small portion of the opening 206. As the third panel 104C moves toward the first end 116 of the track 102, the second intermediate panel 104E and the fourth intermediate panel 104G also move toward the first end 116 of the track 102 with the third panel 104C. Thus, in an example, the second panel 104B, the second intermediate panel 104E, and the fourth intermediate panel 104G extend to occupy an increased coverage area that covers a large portion of the opening 206. Accordingly, in the first position, the second panel 104B, the second intermediate panel 104E, the fourth intermediate panel 104G, and the third panel 104C substantially cover the opening 206 (FIG. 6) in the aircraft 200.

Referring to FIGS. 12 and 13, in an example, as the inboard flap 208 moves to the lowered position, the torque member 210 moves the third panel 104C toward the second end 118 of the track 102. As the third panel 104C moves toward the second end 118 of the track 102, the second intermediate panel 104E and the fourth intermediate panel 104G move toward the second end 118 of the track 102 with the third panel 104C. Thus, in an example, the second panel 104B, the second intermediate panel 104E, and the fourth intermediate panel 104G collapse, or collect, at the second end 118 of the track 102, to occupy a reduced coverage area to cover a small portion of the opening 206. As the third panel 104C moves toward the second end 118 of the track 102, the first intermediate panel 104D and the third intermediate panel 104F also move toward the second end 118 of the track 102 with the third panel 104C. Thus, in an example, the first panel 104A, the first intermediate panel 104D, and the third intermediate panel 104F extend to occupy an increased coverage area to cover a larger portion of the opening 206. Accordingly, in the second position, the first panel 104A, the first intermediate panel 104D, the third intermediate panel 104F, and the third panel 104C substantially cover the opening 206 (FIG. 6) in the aircraft 200.

Referring to FIGS. 14 and 15, in an example, as the inboard flap 208 moves to the intermediate position, the torque member 210 moves the third panel 104C between the first end 116 and the second end 118 of the track 102. As the third panel 104C moves between the first end 116 and the second end 118 of the track 102, the first panel 104A, the first intermediate panel 104D, and the third intermediate panel 104F partially collapse (or partially extend) to occupy an intermediate coverage area. The second panel 104B, the second intermediate panel 104E, and the fourth intermediate panel 104G partially collapse (or partially extend) to occupy an intermediate coverage area. Accordingly, in the intermediate position, the first panel 104A, the first intermediate panel 104D, the third intermediate panel 104F, the third panel 104C, the second panel 104B, the second intermediate panel 104E, and the fourth intermediate panel 104G substantially cover the opening 206 (FIG. 6) in the aircraft 200.

Referring to FIG. 20, in some examples, the method 1000 includes steps of collapsing ones of the panels 104 in an overlapping stacked configuration collected at one end of the apparatus 100, as shown at block 1016, and extending other ones of the panels 104 away from another end of the apparatus 100 to cover the opening 206, as shown at block 1018.

In some examples, the method 1000 includes steps of collapsing ones (e.g., some) of the panels 104 in a first overlapping nested configuration collected at one end of the apparatus 100, as shown at block 1020, and extending other ones of the panels 104 in an overlapping nested configuration away from another end of the apparatus 100 to cover the opening 206, as shown at block 1022.

Figure 21:
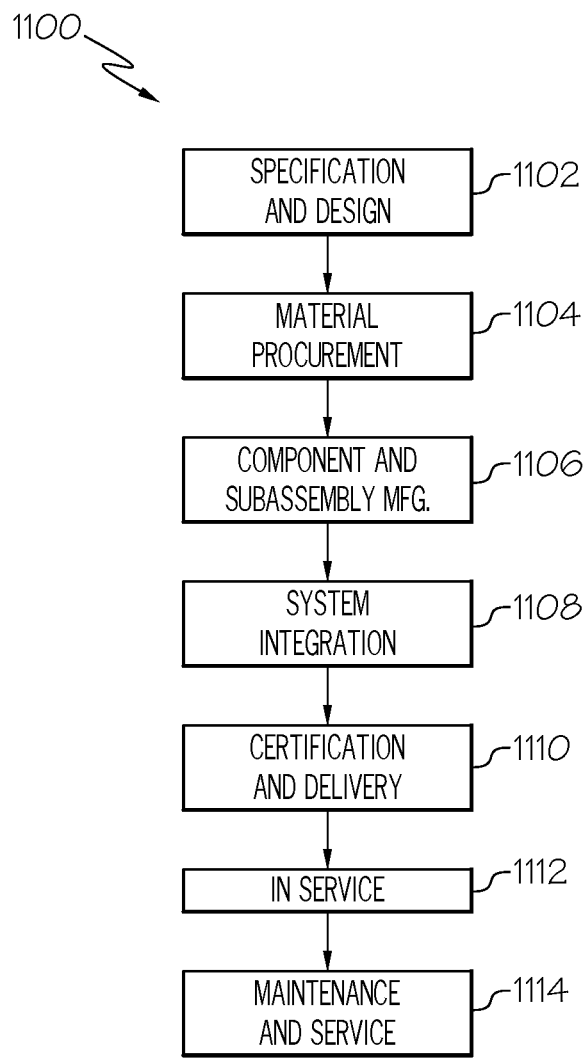
FIG. 21 is a flow diagram of an example aircraft production and service methodology.

Examples of the apparatus 100 and method 1000 disclosed herein may find use in a variety of potential applications, particularly in the transportation industry, including for example, aerospace applications. Referring now to FIGS. 1 and 21, examples of the apparatus 100 and method 1000 may be used in the context of an aircraft manufacturing and service method 1100, as shown in the flow diagram of FIG. 21, and the aircraft 200, as shown in FIG. 1. Aircraft applications of the disclosed examples may include use of the apparatus 100 to cover openings in the aircraft 200.

As shown in FIG. 21, during pre-production, the illustrative method 1100 may include specification and design of the aircraft 200 (Block 1102) and material procurement (Block 1104). During production of the aircraft 200, component and subassembly manufacturing (Block 1106) and system integration (Block 1108) of the aircraft 200 may take place. Thereafter, the aircraft 200 may go through certification and delivery (Block 1110) to be placed in service (Block 1112). The disclosed apparatus 100 and method 1000 may form a portion of component and subassembly manufacturing (Block 1106) and/or system integration (Block 1108). Routine maintenance and service may include modification, reconfiguration, refurbishment, etc. of one or more systems of the aircraft 200.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the apparatus 100 and method 1000 shown or described herein may be employed during any one or more of the stages of the manufacturing and service method 1100 shown in the flow diagram illustrated by FIG. 21. For example, components or subassemblies corresponding to component and subassembly manufacturing (Block 1106) may be fabricated or manufactured in a manner similar to components or subassemblies produced while the aircraft 200 is in service (Block 1112). Also, one or more examples of the apparatus 100, method 1000, or combinations thereof may be utilized during system integration (Block 1108) and certification and delivery (Block 1110). Similarly, one or more examples of the apparatus 100, method 1000, or a combination thereof, may be utilized, for example and without limitation, while the aircraft 200 is in service (Block 1112) and during maintenance and service (Block 1114).

Although examples of the disclosed apparatus 100 and method 1000 are shown to cover openings in the aircraft associated with wing flap actuation, the principles disclosed herein may be applied to any opening formed in the aircraft.

Although an aerospace example is shown, the principles disclosed herein may be applied to other industries, such as the automotive industry. Accordingly, in addition to aircraft, the principles disclosed herein may apply to other vehicles, (e.g., land vehicles, marine vehicles, space vehicles, etc.).

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

In FIGS. 20 and 21, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 20 and 21 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments and/or examples of the disclosed antenna, aerospace vehicle and method have been shown and described, modifications may occur to those skilled in the art upon reading the specification. The present application includes such modifications and is limited only by the scope of the claims.

What is claimed is:

1. An apparatus for covering an opening in a fuselage of an aircraft, the apparatus comprising:
    a track; and
    a plurality of panels coupled to the track, wherein at least one of the panels is movable along the track relative to an adjacent one of the panels between a first position and a second position; and
    an aperture formed in one of the panels that is movable along the track, wherein the aperture is configured to receive a torque member that is coupled at one end to a flap of the aircraft and at another end to a flap support mechanism.

2. The apparatus of claim 1, wherein the aperture is configured to enable the torque member to rotate relative to the third panel.

3. The apparatus of claim 1, wherein the track comprises:
    a first rail coupled to the fuselage; and
    a second rail coupled to the fuselage and spaced away from the first rail.

4. The apparatus of claim 3, wherein the first rail and the second rail are parallel.

5. The apparatus of claim 4, wherein each one of the first rail and the second rail is curved.

6. The apparatus of claim 1, wherein:
    the plurality of panels comprises:
        a first panel located proximate to a track-first end of the track;
        a second panel located proximate to a track-second end of the track; and
        a third panel located between the first panel and the second panel;
    the third panel is movable along the track relative to the first panel and to the second panel between the first position and the second position; and
    the aperture is formed the third panel.

7. The apparatus of claim 6, wherein each one of the first panel and the second panel is fixed to the track.

8. The apparatus of claim 6, wherein:
    the first panel is movable along the track toward the track-second end; and
    the second panel is movable along the track toward the track-first end.

9. The apparatus of claim 8, further comprising:
    a first stop operable to limit movement of the first panel toward the track-second end; and
    a second stop operable to limit movement of the second panel toward the track-first end.

10. The apparatus of claim 6, wherein:
    the plurality of panels further comprises:
        a first intermediate panel located between the first panel and the third panel; and
        a second intermediate panel located between the second panel and the third panel;
    the first intermediate panel is movable along the track with the third panel; and
    the second intermediate panel is movable along the track with the third panel.

11. The apparatus of claim 10, wherein:
    with the third panel in the first position, the first panel, the first intermediate panel, and the third panel are arranged in a first stacked configuration; and
    with the third panel in the second position, the second panel, the second intermediate panel, and the third panel are arranged in a second stacked configuration.

12. The apparatus of claim 10, wherein:
    with the third panel in the first position, the first panel, the first intermediate panel, and the third panel are arranged in a first nested configuration; and
    with the third panel in the second position, the second panel, the second intermediate panel, and the third panel are arranged in a second nested configuration.

13. An aircraft comprising:
    a fuselage having an opening;
    a wing coupled to the fuselage;
    a flap coupled to the wing adjacent to the fuselage;
    a torque member coupled to the flap;
    a track coupled to the fuselage adjacent to the opening; and
    a plurality of panels coupled to the track such that the plurality of panels covers the opening; and wherein:
    the torque member extends into the opening through one of the panels; and
    at least one of the panels is movable along the track relative to an adjacent one of the panels as the flap moves between a first position and a second position.

14. The aircraft of claim 13, wherein:
    the plurality of panels comprises:
        a first panel located proximate to a track-first end of the track;
        a second panel located proximate to a track-second end of the track; and
        a third panel located between the first panel and the second panel; and
    the third panel moves along the track relative to the first panel and to the second panel as the flap moves between the first position and the second position.

15. The aircraft of claim 14, wherein:
    the plurality of panels further comprises:
        a first intermediate panel located between the first panel and the third panel; and
        a second intermediate panel located between the second panel and the third panel;
    the first intermediate panel moves along the track with the third panel; and
    the second intermediate panel moves along the track with the third panel.

16. The aircraft of claim 14, wherein the third panel has an aperture, and wherein the aperture is configured to receive the torque member.

17. The aircraft of claim 16, wherein the aperture is configured to enable the torque member to rotate relative to the third panel as the flap moves between the first position and the second position.

18. A method for covering an opening in a fuselage of an aircraft, the method comprising:
  covering the opening with a plurality of panels located adjacent to the opening;
  extending a torque member of a flap, coupled to a wing of the aircraft, through an aperture in one of the panels; and
  moving at least the one of the panels relative to an adjacent one of the panels as the flap moves between a first position and a second position.

19. The method of claim 18, further comprising moving the torque member through a travel path as the flap moves between the first position and the second position, wherein moving the torque member through the travel path moves at least the one of the panels along a track, coupled to the fuselage, between a track-first end and a track-second end of the track.

20. The method of claim 19, further comprising rotating the torque member within the aperture relative to the one of the panels as the torque member moves through the travel path.

* * * * *